(12) United States Patent
Takayama

(10) Patent No.: US 9,569,150 B2
(45) Date of Patent: Feb. 14, 2017

(54) SERVER CONTROLLING JOB MANAGEMENT BY A PLURALITY OF IMAGE FORMING DEVICES

(71) Applicant: CANON KABUSHIKI KAISHA, Tokyo (JP)

(72) Inventor: Makoto Takayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/790,533

(22) Filed: Jul. 2, 2015

(65) Prior Publication Data

US 2016/0011828 A1 Jan. 14, 2016

(30) Foreign Application Priority Data

Jul. 11, 2014 (JP) .................................. 2014-143217

(51) Int. Cl.
*G06F 3/12* (2006.01)
*H04N 1/00* (2006.01)
*G06K 15/00* (2006.01)

(52) U.S. Cl.
CPC ............ *G06F 3/1221* (2013.01); *G06F 3/126* (2013.01); *G06F 3/1241* (2013.01); *G06F 3/1288* (2013.01); *H04N 1/0096* (2013.01); *H04N 1/00244* (2013.01); *H04N 1/00344* (2013.01); *H04N 1/00931* (2013.01); *H04N 1/00933* (2013.01); *Y02B 60/1271* (2013.01)

(58) Field of Classification Search
CPC ...... G06K 15/00; G06F 3/1221; G06F 3/1264; G06F 3/1276; G06F 3/1297; H04N 1/00244; H04N 1/00344; H04N 1/00931; H04N 1/00933; H04N 1/0096

USPC ........ 358/1.1, 1.9, 1.13, 1.15; 382/232, 233, 382/239, 284, 305
See application file for complete search history.

(56) References Cited

U.S. PATENT DOCUMENTS

| 7,167,263 B2 | 1/2007 | Takayama | |
|---|---|---|---|
| 7,856,055 B2 * | 12/2010 | Zhou | H04N 7/0112 375/240.12 |
| 7,903,271 B2 * | 3/2011 | Aiyama | G06K 15/00 358/1.13 |
| 2015/0121392 A1 * | 4/2015 | Bao | G06F 9/5044 718/104 |

FOREIGN PATENT DOCUMENTS

| JP | 2002-142385 | 5/2002 |
|---|---|---|
| JP | 2003-299264 | 10/2003 |

* cited by examiner

*Primary Examiner* — Gabriel Garcia
(74) *Attorney, Agent, or Firm* — Fitzpatrick, Cella, Harper & Scinto

(57) ABSTRACT

An object is to perform processing on an expedited basis by a plurality of printers while maintaining the total power consumption of the plurality of printers at a low level. A server for managing a plurality of jobs to be performed by a plurality of image forming devices having a print engine, the server comprising: a job division instruction unit configured to instruct the image forming devices to which the jobs are input to divide each of the plurality of jobs into preprocessing that does not involve driving of the print engine and postprocessing that involves driving of the print engine; and a job management unit configured to control timing of starting the postprocessing to prevent the postprocessing from being performed simultaneously by the plurality of image forming devices.

13 Claims, 19 Drawing Sheets

SERVER CONTROLLING JOB MANAGEMENT BY A PLURALITY OF IMAGE FORMING DEVICES

BACKGROUND OF THE INVENTION

Field of the Invention

The present invention relates to a technique of controlling jobs to be performed by a plurality of image forming devices under the management of a server.

Description of the Related Art

In an office environment, as routine work, an instruction to print document data is given from a PC to an image forming device such as a Multi Function Printer (MFP) in order to perform printing in an environment in which the PC and the image forming device are connected via a network. In recent years, there is a growing tendency to save power and, in office work, there is also a need to save energy.

FIG. 1 is a graph showing a relationship between power consumption and elapsed time in performing a plurality of types of jobs with one MFP. The vertical axis of the graph shows the power consumption of a controller of the image forming device, and the lateral axis shows the elapsed time. As is understood from the graph of FIG. 1, power consumption for a copy job and a print job is far higher than power consumption for any other processing (such as processing for a scan job or sleep processing).

FIG. 2 is a graph showing a relationship between power consumption and elapsed time in performing print jobs simultaneously with two MFPs. It is found from the graph of FIG. 2 that in a case where the two MFPs simultaneously perform print jobs whose power consumption is high, the total power consumption of the controller is sharply increased. This means that maximum power consumption in an office environment is increased greatly. In order to save energy, it is important to reduce maximum power consumption.

From this viewpoint, in the case of using a plurality of MFPs, it is conceivable to perform control so that after a first MFP completes a print job, a second MFP performs a print job (sequential control). FIG. 3 is a graph showing a relationship between power consumption and elapsed time in a case where control is performed so that two MFPs sequentially perform print jobs. Maximum power consumption can be reduced by performing control in the above manner.

However, in a case where control is performed in the above manner to prevent the plurality of print jobs from being overlapped with each other, the second job does not start until the first job ends. This makes it time-consuming to perform the jobs and reduces work efficiency. Further, Japanese Patent Laid-Open No. 2003-299264 and No. 2002-142385 proposes a technique of controlling power by measuring the amount of a rush current of a device and the amount of power of a whole system. However, devices for the measurements and the like are necessary, and the cost becomes high.

Further, besides a print function, an MFP has various functions such as a copy function, a SEND function (a function for scanning a manuscript and transferring resultant electronic data), and a FAX transmission/reception function. Accordingly, it is necessary to perform comprehensive control for processing these jobs. For example, in a case where printing is being performed, a user has to wait at an MFP for a copy job or a FAX transmission job instructed by an operation unit of an MFP body until the print job ends and mere sequential control may result in significant reduction in work efficiency. Accordingly, efficient processing for jobs other than a print job is also required to be attained.

SUMMARY OF THE INVENTION

According to the present invention, there is provided a server for managing a plurality of jobs to be performed by a plurality of image forming devices having a print engine, the server comprising: a job division instruction unit configured to instruct the image forming devices to divide each of the plurality of jobs into preprocessing that does not involve driving of the print engine and postprocessing that involves driving of the print engine; and a job management unit configured to control timing of starting the postprocessing to prevent the postprocessing from being performed simultaneously by the plurality of image forming devices.

Further features of the present invention will become apparent from the following description of exemplary embodiments (with reference to the attached drawings).

DESCRIPTION OF THE EMBODIMENTS

Embodiments for carrying out the present invention will be described below with reference to the drawings. However, elements described in the embodiments are mere examples, and do not limit the scope of the present invention.

[Embodiment 1]

As stated above, an MFP has various functions such as a print function, a copy function, a scan function, a FAX function, and a SEND function. Among the various functions of the MFP, the print function, the copy function, and the FAX reception function include processing that involves printing output, and use a large amount of power. This is because driving of a print/output mechanism (a print engine) consumes a large amount of power (about 1000 W). However, processing of jobs such as a print job, a copy job, and a FAX reception job does not always require a large amount of power from the beginning to the end, and includes processing which is not directly related to printing output. For example, in the case of the print job, power of only about 10 to 20 W is normally consumed during processing (RIP processing) for interpreting a PDL included in document data to be transmitted from a PC or the like, and generating and storing bitmap data. More specifically, even in the case of a type of job that involves printing output, the content of the job can be divided into low-power-consumption pre-stage processing (preprocessing) that does not involve driving of the print engine and high-power-consumption post-stage processing (postprocessing) that involves driving of the print engine. Incidentally, the present specification provides explanation by taking the MFP as an example, but an image forming device controlled under the management of a server includes not only an MFP, but also a Single Function Printer (SPF), a dedicated scanner, or the like.

In the present embodiment, explanation will be made on a case where the type of job is limited to a print job. The RIP processing whose power consumption is low is performed once it becomes necessary to perform the print job. This means that the RIP processing is not prevented from being performed simultaneously. The print processing (postprocessing) whose consumption power is high is controlled to prevent the print processing from being performed simultaneously by the plurality of MFPs.

Figure 1:
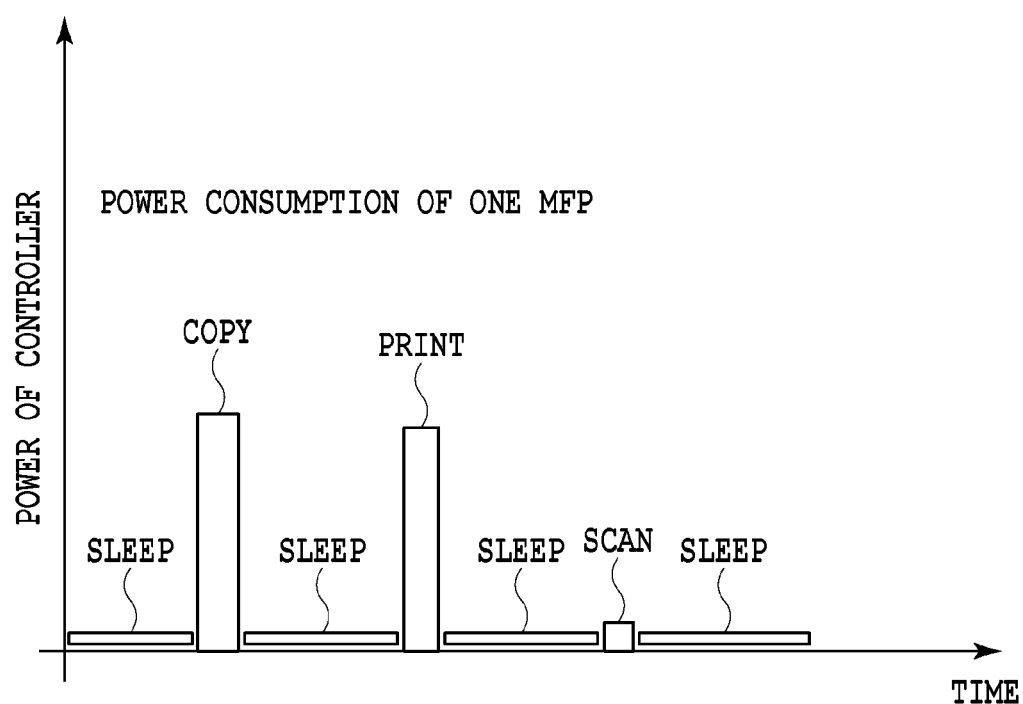
FIG. 1 is a graph showing a relationship between power consumption and elapsed time in a case where one MFP performs a plurality of types of jobs.
Figure 2:
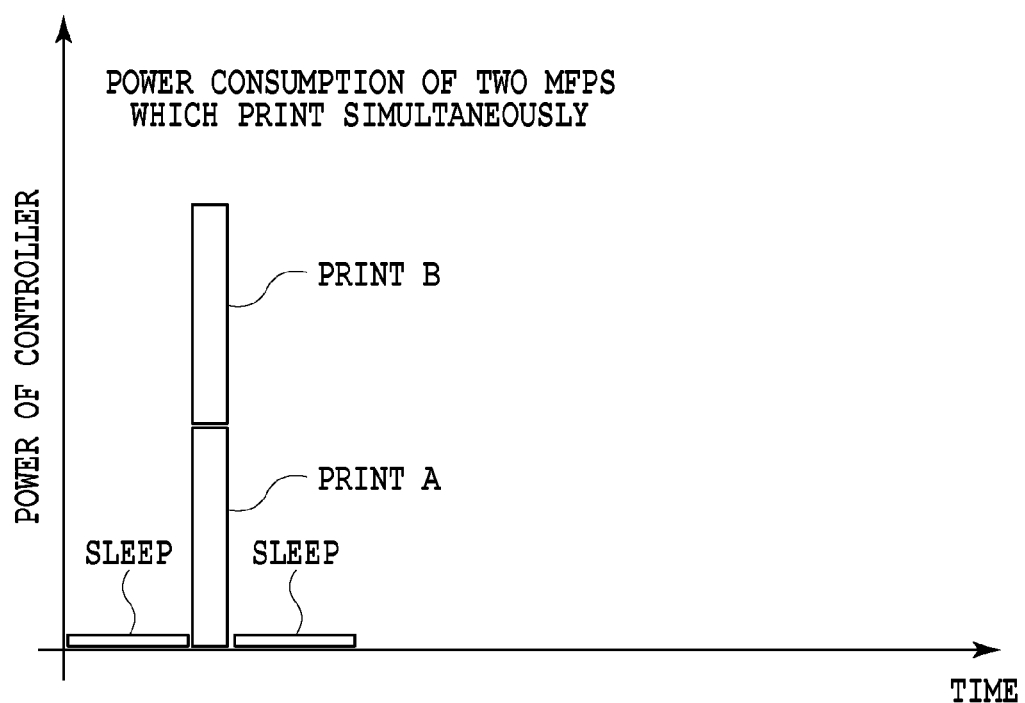
FIG. 2 is a graph showing a relationship between power consumption and elapsed time in a case where two MFPs perform print jobs.
Figure 3:
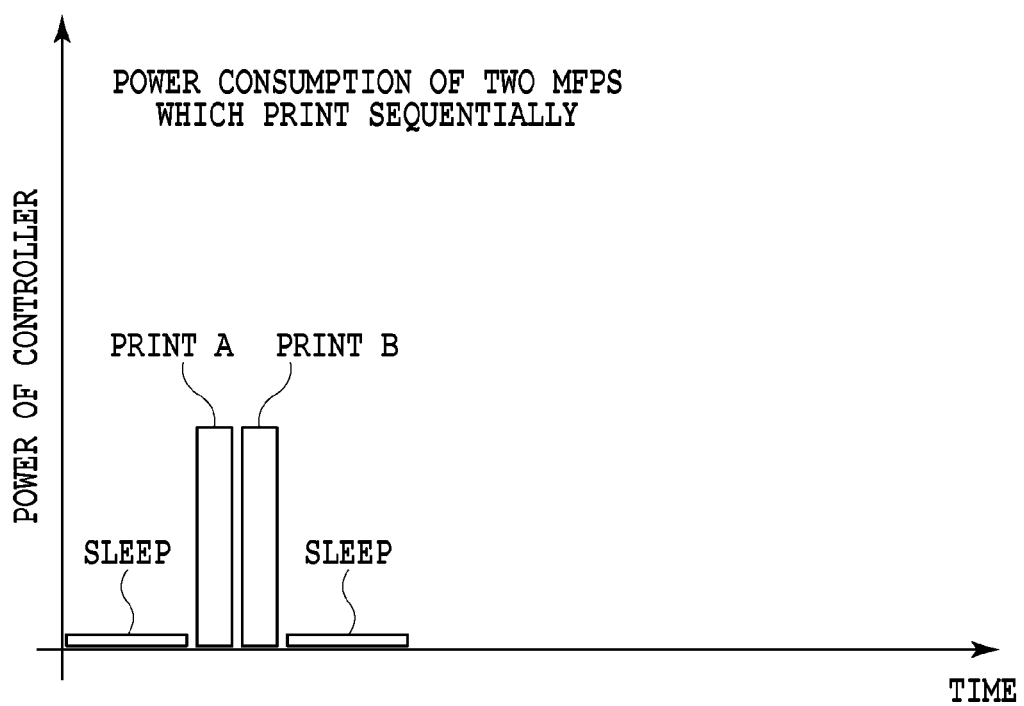
FIG. 3 is a graph showing a relationship between power consumption and elapsed time in a case where control is performed so that two MFPs sequentially perform print jobs.
Figure 4:
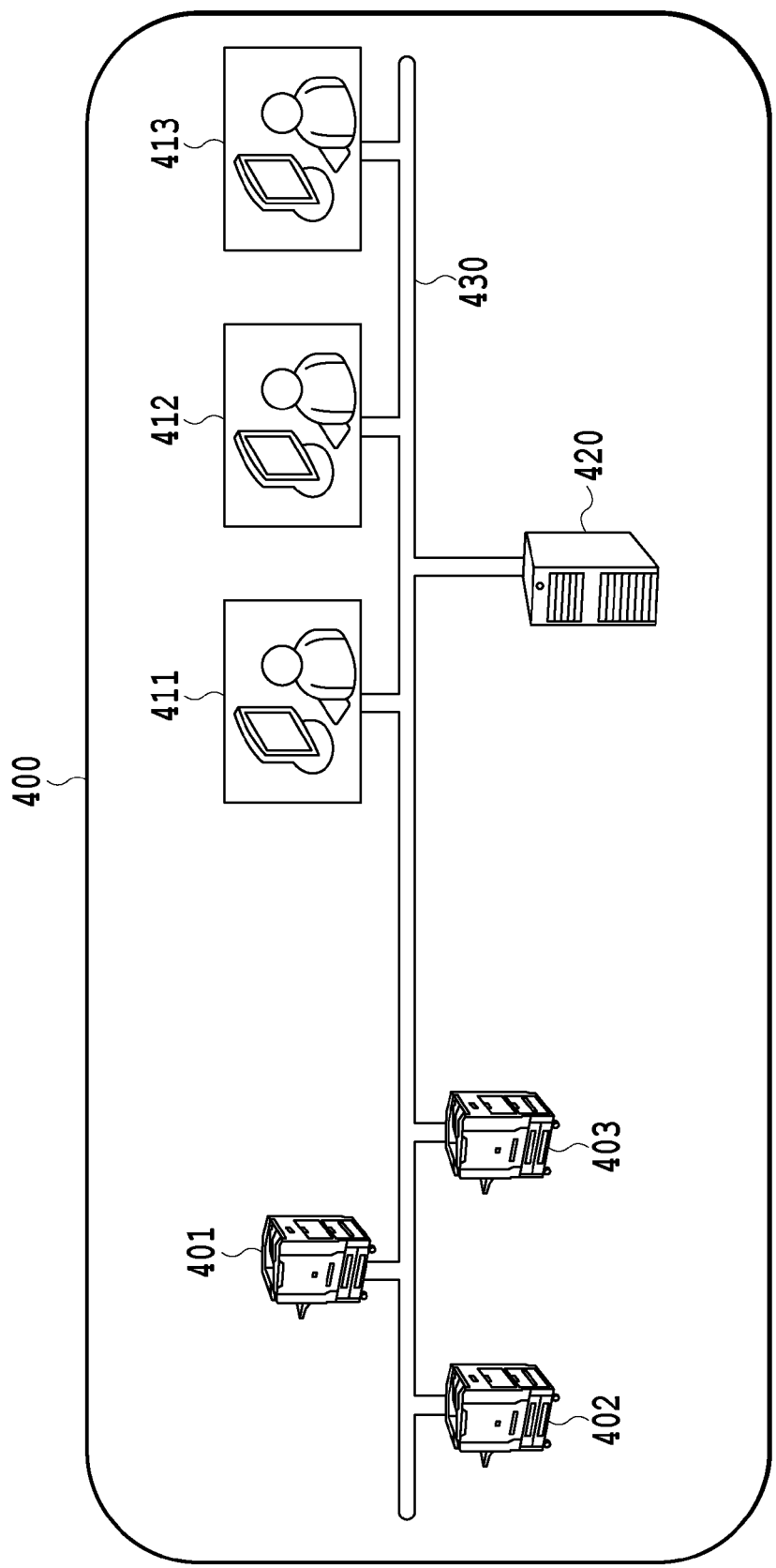
FIG. 4 is a view showing an example of the configuration of a job management system according to Embodiment 1 of the present invention.

FIG. 4 is a view showing an example of the configuration of a job management system according to the present embodiment. A job management system 400 includes three MFPs 401 to 403, three PCs 411 to 413, and one server 420, and these elements are connected via a network 430 such as a LAN. The server 420 exchanges information with the MFPs 401 to 403 and the PCs 411 to 413 via the network 430.

Figure 5:
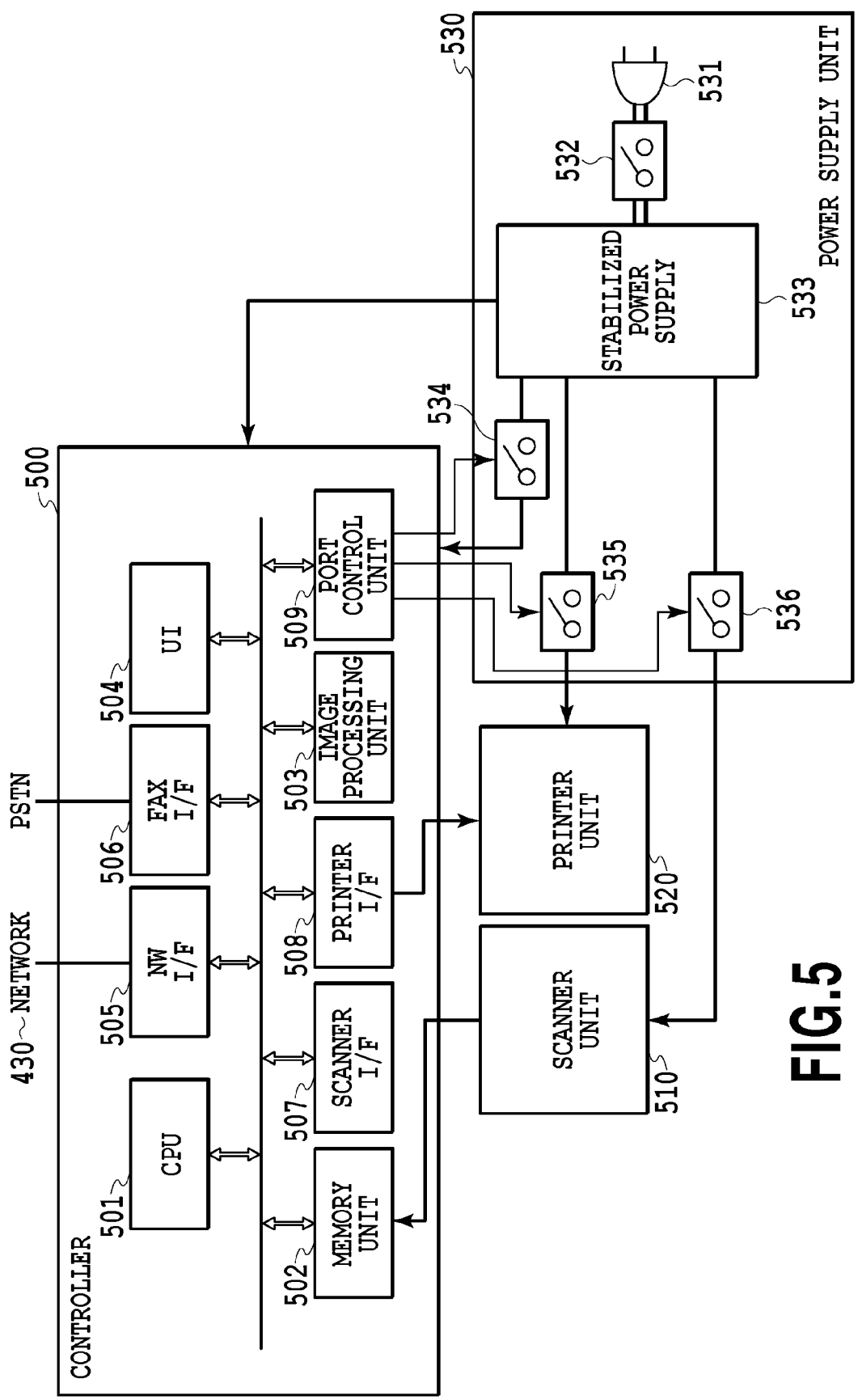
FIG. 5 is a diagram showing an example of the inner configuration of an MFP.

FIG. 5 is a diagram showing an example of the inner configurations of the MFPs 401 to 403.

Each MFP includes a controller 500, a scanner unit 510, a printer unit 520, and a power supply unit 530.

The controller 500 includes a CPU 501, a memory unit 502, an image processing unit 503, a UI (an operation unit) 504, a network I/F 505, a FAX I/F 506, a scanner I/F 507, a printer I/F 508, and a port control unit 509, and controls the entire MFP. Further, the memory unit 502 includes a ROM, a RAM, and an HDD.

The scanner unit 510 optically reads a manuscript set on a platen (not shown) and obtains image data.

In the case of electrophotography, for example, the printer unit 520 includes a printer engine for each color of toner which is a color material, and forms an image on a print medium such as paper.

The power supply unit 530 includes a plug 531 for supplying AC power from a commercial power supply, a main power supply SW532 for turning on/off the supply of AC power, and a stabilized power supply 533 for adjusting AC power from the plug 531. Further, the power supply unit 530 includes a power supply SW534 for turning on/off the supply of non-all-night power to the controller 500, a power supply SW535 for turning on/off the supply of power to the printer unit 520, and a power supply SW536 for turning on/off the supply of power to the scanner unit 510. All-night power output from the stabilized power supply 533 of the power supply unit 530 is always supplied to the controller 500, and is used as the standby power of an MFP (power used while the MFP is in a sleep state). The power supplies SW534 to SW536 are controlled via the port control unit 509.

In the sleep state, the CPU 501, the RAM, the port control unit 509, the network I/F 505, the FAX I/F 506, and the UI 504 are energized, and are in a standby mode in order to respond to job input and FAX reception via the network 430 and a user's operation of the UI 504.

Figure 6:
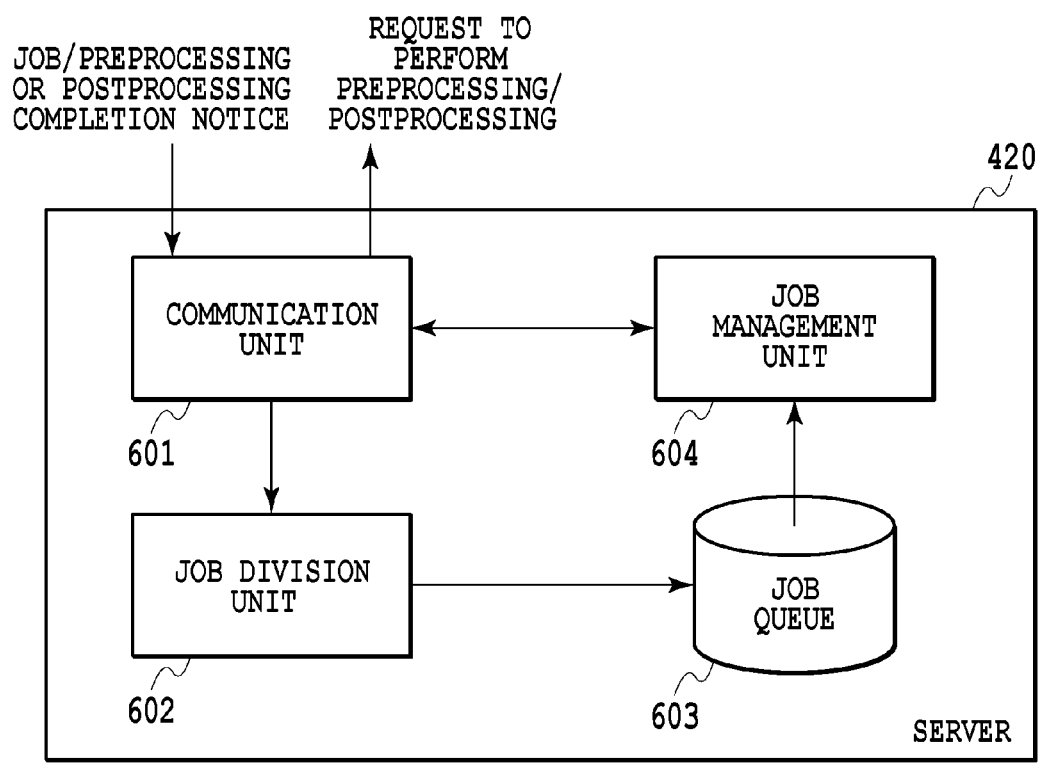
FIG. 6 is a functional block diagram showing the software configuration of a server.

FIG. 6 is a functional block diagram showing the software configuration of the server 420. Incidentally, the server 420 includes hardware (not shown) of a commonly used server computer. More specifically, the server 420 includes not only a CPU, a RAM, a ROM, an HDD, and the like, but also a communication I/F for exchanging various types of data with the PCs 411 to 413 and the MFPs 401 to 403 on the network 430. The following units are realized by the CPU executing programs.

The server 420 includes a communication unit 601, a job division unit 602, a job queue (storage unit) 603, and a job management unit 604.

The communication unit 601 communicates with the PCs 411 to 413 and the MFPs 401 to 403. More specifically, the communication unit 601 receives print jobs from the PCs 411 to 413, and receives jobs such as copy jobs, scan jobs, FAX jobs, and SEND jobs from the MFPs 401 to 403. Further, the communication unit 601 also transmits, to the MFPs 401 to 403, a request to perform preprocessing and postprocessing after job division.

The job division unit 602 divides various jobs received from the PCs 411 to 413 and the MFPs 401 to 403 into preprocessing and postprocessing. For example, a print job is divided in the following manner.

Preprocessing: Processing for interpreting a PDL included in document data transmitted from a PC or the like and generating and storing bitmap data (RIP processing)

Postprocessing: Processing for decompressing as necessary the bitmap data stored in an HDD or the like and driving the print engine by the printer unit 520 to print a print medium such as paper The job queue 603 is a module for managing received jobs as a first-in-first-out queue. Basically, input jobs are performed on a first-come-first-served basis. In the present embodiment, the preprocessing of the input jobs are controlled in response to receiving of the input jobs. Meanwhile, the postprocessing of the input jobs are controlled to be prevented from being performed simultaneously, and to control the input jobs to be performed in the input order.

The job management unit 604 manages and controls timings for transmitting a request to perform the preprocessing and the postprocessing obtained by dividing the jobs by the job division unit 602 while monitoring the operation states of the MFPs 401 to 403. More specifically, the timing of starting to perform the postprocessing is controlled to prevent the postprocessing from being performed simultaneously by a plurality of image forming devices.

Figure 7:
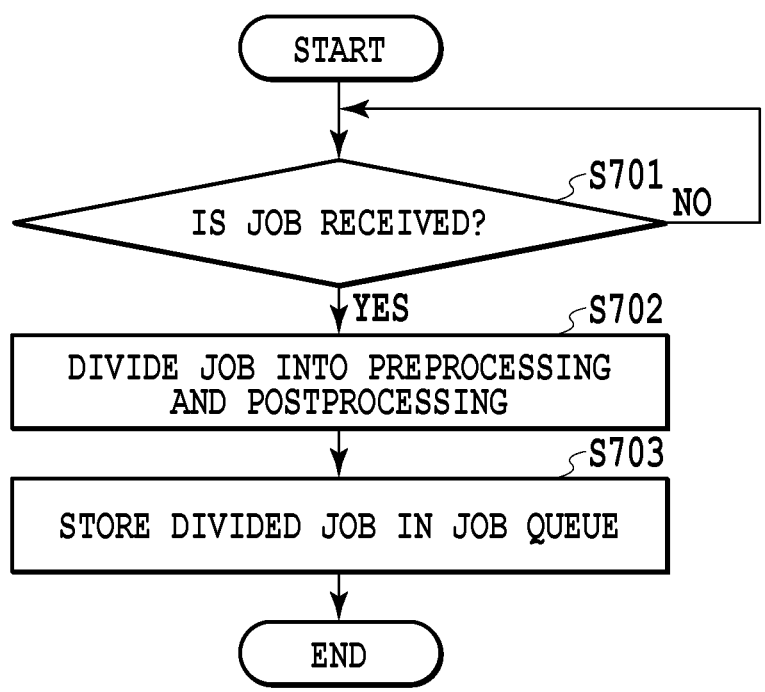
FIG. 7 is a flowchart showing processing for controlling a print job according to Embodiment 1 of the present invention.
Figure 8:
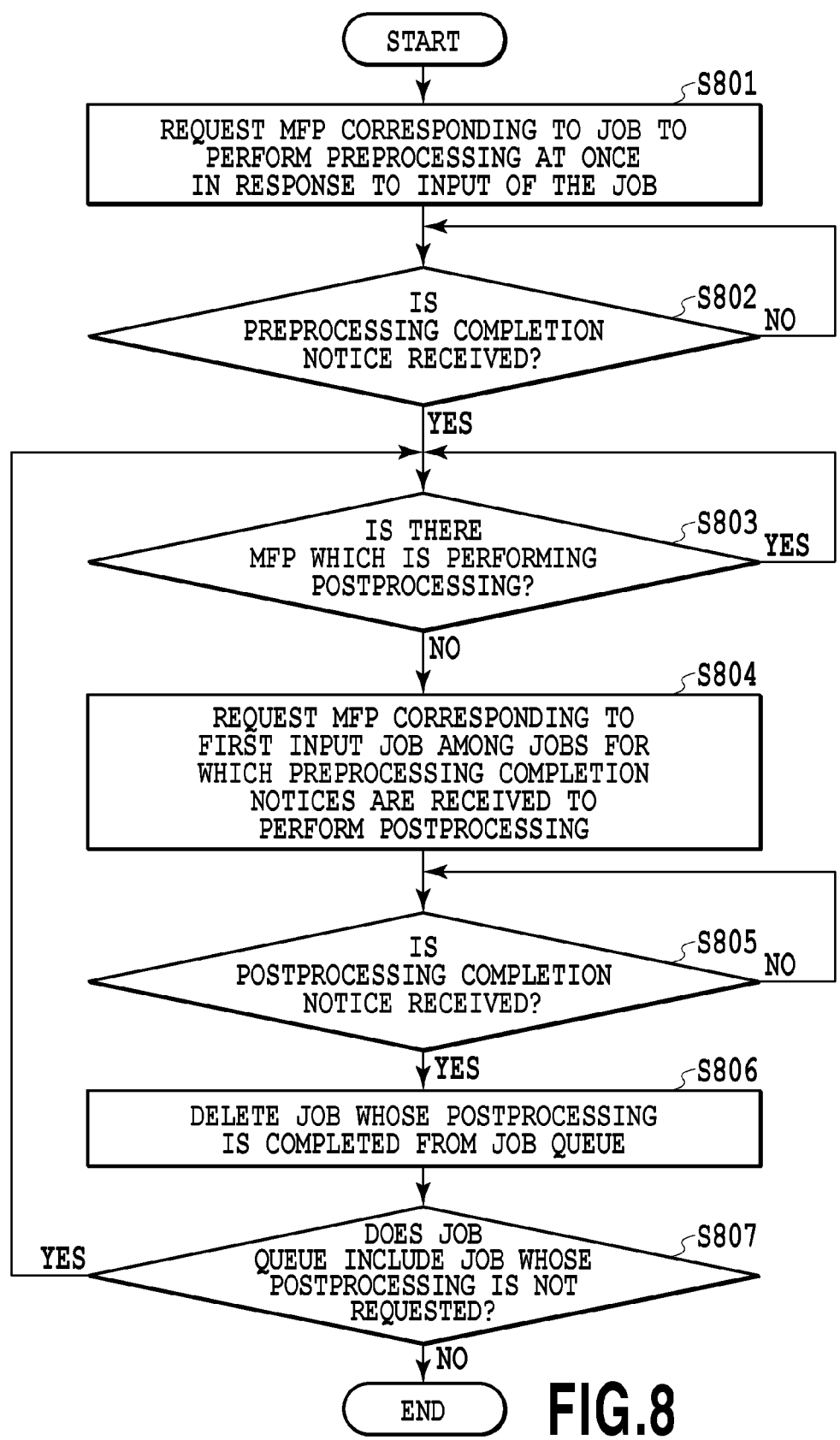
FIG. 8 is a flowchart showing processing for controlling a print job according to Embodiment 1 of the present invention.

Next, explanation will be made on processing for controlling print jobs by the server 420 of the present embodiment. FIGS. 7 and 8 are flowcharts showing processing for controlling a print job according to the present embodiment. FIG. 7 shows processing for dividing received print jobs and storing the divided jobs in a job queue. FIG. 8 shows processing for controlling timings of performing preprocessing and postprocessing for print jobs stored in the job queue, according to the operation states of the MFPs.

Firstly, the flowchart of FIG. 7 will be explained.

In step 701, the communication unit 601 determines whether or not a print job is received from any of the PCs 411 to 413. If determined that the print job is received, the process proceeds to step 702.

In step 702, the job division unit 602 divides the received print job into the above-described preprocessing and postprocessing.

In step 703, the job division unit 602 stores, as the job queue 603, the print job which is divided into the preprocessing and the postprocessing in a RAM or the like.

Next, the flowchart of FIG. 8 will be described.

In step 801, the job management unit 604 requests an MFP specified by each print job stored in the job queue 603 to perform the preprocessing for the print job at once in response to input of the job. In response to the request, the port control unit 509 of each MFP turns on the power supply SW534 and supplies non-all-night power to the controller 500. In this manner, the MFP gets out of the sleep state, and the CPU 501 performs the preprocessing.

In step 802, the job management unit 604 determines whether or not the notice that the preprocessing is completed (hereinafter referred to as the preprocessing completion notice) is received from the MFP which is requested to perform the preprocessing. This preprocessing completion notice is a notice issued by the MFP which is requested to perform the preprocessing, and in the present embodiment, the preprocessing completion notice is issued at a stage where PDL interpretation and bitmap data generation as preprocessing are completed. A request to perform the preprocessing is made at appropriate timing at a stage where the print job is received and divided. Accordingly, preprocessing completion notices may be received substantially at the same time from a plurality of MFPs. If the preprocessing completion notice is received, the process proceeds to step 803. The port control unit 509 causes the MFP which transmits the preprocessing completion notice to the server 420 to shift into the sleep state in a case where there is no preprocessing or postprocessing which needs to be performed immediately.

In step 803, the job management unit 604 determines whether an MFP, which is performing print processing (processing in which the print engine forms an image on a print medium based on bitmap data) as post processing, is on the network. In the present embodiment, it is determined whether or not any of the MFPs 401 to 403 is performing print processing as postprocessing. For example, in a case where a request to perform postprocessing (step 804 which will be described later) is already made while the notice that the postprocessing corresponding to the request is completed is not yet received (in step 805 which will be described later, a determination result is No), it is determined that there is an MFP which is performing postprocessing. If determined that there is no MFP which is performing print processing as postprocessing, the process proceeds to step 804. On the other hand, if determined that there is an MFP which is performing print processing as postprocessing, the job management unit 604 is in a standby state until the postprocessing is completed.

In step 804, the job management unit 604 makes a request to perform postprocessing to an MFP specified by the first input print job among print jobs for which preprocessing completion notices are received. More specifically, in a state in which preprocessing completion notices are received from the plurality of MFPs, a request is made to perform postprocessing for the first input print job. Then the port control unit 509 causes the MFP which is requested to perform the postprocessing to get out of the sleep state, and the MFP performs the postprocessing by using the printer unit 520.

In step 805, the job management unit 604 determines whether or not the notice that the postprocessing is completed (hereinafter referred to as the postprocessing completion notice) is received from the MFP which is requested to perform the postprocessing. This postprocessing completion notice is a notice issued by the MFP which is requested to perform the postprocessing, and is issued at a stage where print processing as the postprocessing is completed. An operation of issuing the request to perform the postprocessing is in a standby state until in the above step 803, the other MFPs complete postprocessing, and is not performed simultaneously for the plurality of MFPs. Accordingly, the job management unit 604 needs to monitor only transmission information from the MFP which is requested to perform the postprocessing. In a case where the postprocessing completion notice is received, the process proceeds to step 806. The port control unit 509 causes the MFP which transmits the postprocessing completion notice to the server to shift into the sleep state in a case where there is no preprocessing or postprocessing which needs to be performed immediately.

In step 806, the job management unit 604 deletes, from the job queue 603, a print job relating to the received postprocessing completion notice.

In step 807, the job management unit 604 determines whether or not the job queue 603 includes a print job whose postprocessing is not requested. More specifically, by referring to the job queue 603, the job management unit 604 determines whether there is a print job for which a preprocessing completion notice is received but whose postprocessing is not requested to be performed. If determined that the job queue 603 includes a print job whose postprocessing is not requested, the process returns to step 803, and in a case where there is no other MFP which is performing postprocessing, a request is made to perform postprocessing for the first input print job. In the present embodiment, the process returns to step 803, but the process may return to step 804. This is because requests to perform postprocessing are not simultaneously issued to the plurality of MFPs and a determination result in step 803 to which the process returns is always "No," which in the end, allows the process to proceed to step 804. On the other hand, if determined that the job queue 603 does not include any print job whose postprocessing is not requested, the process ends. In the above determination steps 802 and 805, it is possible to use not only the preprocessing completion notice and the postprocessing completion notice, but also a notice that a shift into the sleep state is made (a sleep shift notice). More specifically, in a case where both the preprocessing (postprocessing) completion notice and the sleep shift notice are received, the process may proceed to a next step. Otherwise, in a case where the sleep shift notice is received, the process may proceed to a next step.

Embodiments 2 and 3 which will be described later may use the feature that an MFP shifts into and away from the sleep state as explained with respect to the present embodiment.

The above two processing are performed independently of each other (in parallel). More specifically, in a case where a new print job is received while the control processing shown in FIG. 8 is performed, processing for dividing and storing the job as shown in FIG. 7 is performed each time.

Figure 9:
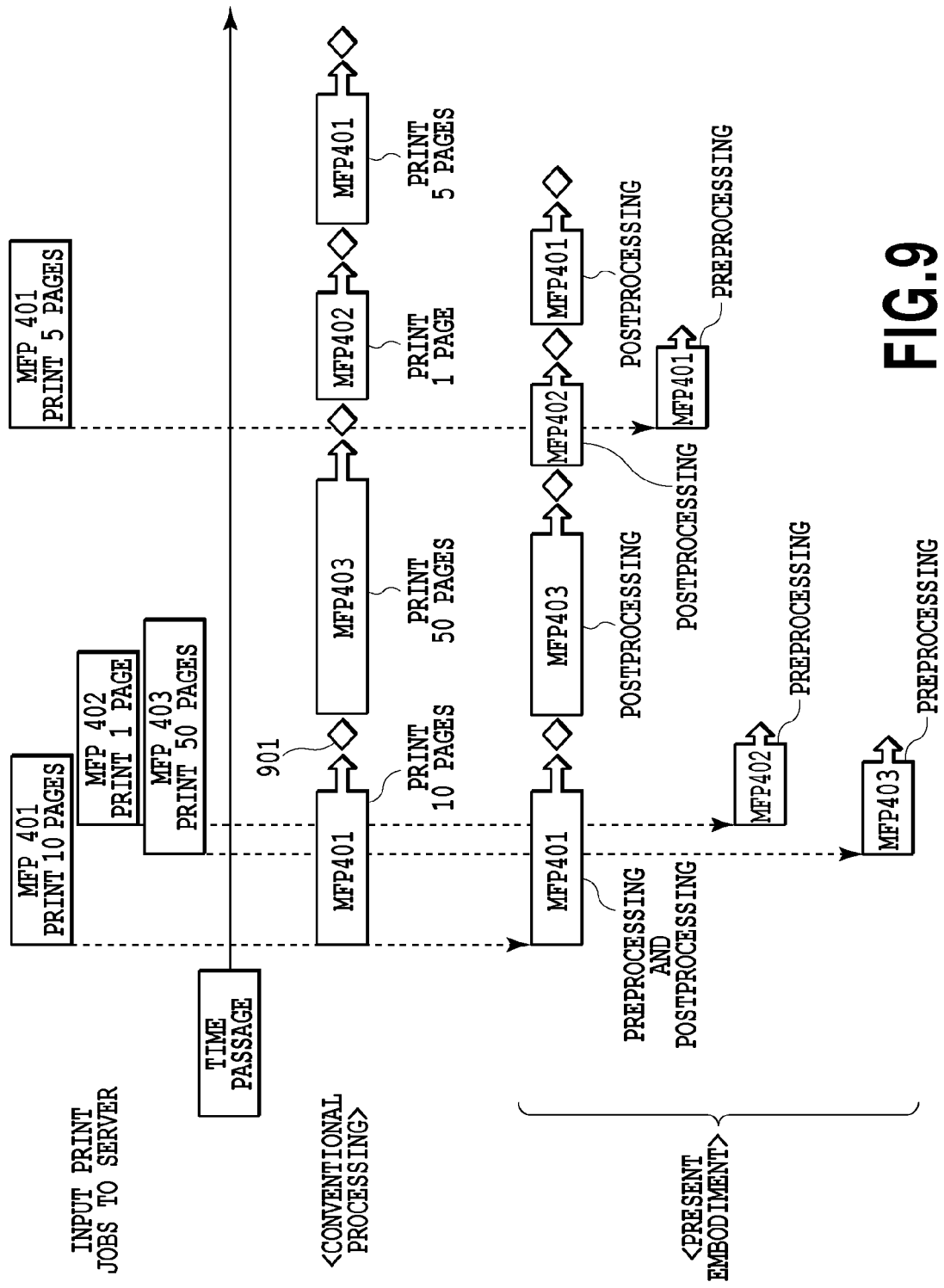
FIG. 9 is a diagram for explaining how to perform print jobs by a plurality of MFPs on a network according to Embodiment 1 of the present invention as compared with a conventional technique.

FIG. 9 is a diagram for explaining how to perform print jobs by a plurality of MFPs on a network according to the present embodiment as compared with a conventional technique. FIG. 9 shows, in time series, how to process print jobs sequentially input to the MFPs 401 to 403 as compared with the conventional technique. This example assumes sequential input of a print job to the MFP 401 for printing 10 pages at the beginning, next a print job to the MFP 403 for printing 50 pages, next a print job to the MFP 402 for printing one page, and lastly a print job to the MFP 401 for printing five pages.

Firstly, in conventional processing, print jobs specified by MFPs are sequentially performed in the order that the print jobs are registered in the server (the order that the jobs are input). More specifically, the MFP 401 is firstly instructed to print 10 pages, and thereafter the MFP 403 is instructed to print 50 pages, and so on. In this manner, the print jobs are performed in a nonoverlapping manner in the order that the print jobs are input. In FIG. 9, a rhombus mark 901 indicates that an MFP which completes a print job shifts into the sleep state.

In the present embodiment, as stated above, postprocessing that involves driving of the print engine is controlled to be performed in the order registered in the server so as to prevent the plurality of MFPs from simultaneously performing postprocessing. Further, preceding RIP processing (preprocessing) is controlled to be performed at appropriate timing at a stage where a print job is input. In other words, a target MFP is requested to perform preprocessing at a stage where a print job is input even in a case where another MFP performs postprocessing. In an example shown in FIG. 9, while postprocessing for a print job firstly input to the MFP 401 is performed, preprocessing for a print job subsequently input to the MFP 403 and preprocessing for a print job further subsequently input to the MFP 402 are performed. In the present embodiment, among processing necessary to perform a print job, preprocessing is controlled to be performed at once in response to input of the job. Accordingly, it becomes possible to make total processing time shorter than the time required for conventional processing. Further, postprocessing whose power consumption is high is controlled to be performed in a nonoverlapping manner, and accordingly, an increase in power consumption can be minimized. Incidentally, the present embodiment has been described by limiting the type of job to a print job, but the flowcharts shown in FIGS. 7 and 8 and the specific example shown in FIG. 9 can also be applied to other types of jobs such as a copy job and a FAX reception job.

According to the present embodiment, jobs input to the plurality of MFPs can be performed on an expedited basis while the total maximum power consumption of the plurality of MFPs under the management of the server is kept at a low level.

[Embodiment 2]

Embodiment 1 has been described by limiting the type of job to a print job. However, in an actual office environment, business is conducted by using not only a print function, but also various functions such as a copy function, a scan function, a FAX function, and a SEND function. Accordingly, explanation will be made on a case where a print job, a copy job, a FAX reception job, and a SEND job coexist. In the present embodiment, explanation will be made on a case where jobs are controlled so that preprocessing whose power consumption is low is performed at once in response to input of the job, and postprocessing whose power consumption is high is not performed simultaneously in parallel by the plurality of MFPs according to predetermined priority.

The predetermined priority is set so that high priority is set for a job which is likely to lower work efficiency in an office unless the job is preferentially performed, and low priority is set for a job which does not have such high urgency.

In the case of copying, for example, a user needs to go near an MFP and operate the UI 504. Accordingly, a copy job is a job which is desired to be performed as soon as possible, and it is conceivable to set higher priority for a copy job than the other jobs.

In the case of FAX reception, a user rarely waits at an MFP, and usually notices FAX reception after receipt of a FAX (the FAX is printed out). Accordingly, it is conceivable to set the priority of a FAX reception job to be lower than that of a copy job.

In the case of print output, it is also usual for a user at his or her desk located away from an MFP to give printing instructions to the MFP by using a PC, and to go to the MFP to pick up a printed material at appropriate time. Accordingly, it is conceivable to set the priority of a print job to be lower than that of another job. Incidentally, in a case where a plurality of jobs having the same priority are input to the server 420, postprocessing is performed sequentially in the order from postprocessing for a firstly input job.

It is possible to set the predetermined priority in any manner. Further, the predetermined priority may be determined for each input job based on, for example, the above-described reference information stored in an HDD (not shown) of the server 420. The present embodiment is not different from Embodiment 1 in the configuration of the job management system and the inner configurations of the MFPs 401 to 403, and thus the explanation of the present embodiment is omitted herein.

<Processing for Controlling Postprocessing According to Predetermined Priority>

For example, a case in which a certain MFP is performing postprocessing for a plurality of print jobs is considered where a user makes a copy by using the UI 504 of the MFP. In a case where the user cannot make a copy until the MFP completes all the plurality of print jobs which are being performed, the user needs to wait at the MFP until printing is completed, and work efficiency is more likely to be lowered. In the present embodiment, control is performed to cause postprocessing for a high priority job to interrupt postprocessing for a plurality of jobs which are being performed, whereby the user eliminates the above-described disadvantage at the MFP. More specifically, postprocessing for jobs is not performed by the MFPs in the order that the jobs are input to the server 420 as in Embodiment 1, and postprocessing for a job whose predetermined priority is high is preferentially performed by an MFP even in a case where the job is input at a later time.

Explanation will be made below on control processing for causing postprocessing for a high priority job to interrupt other postprocessing.

Figure 10:
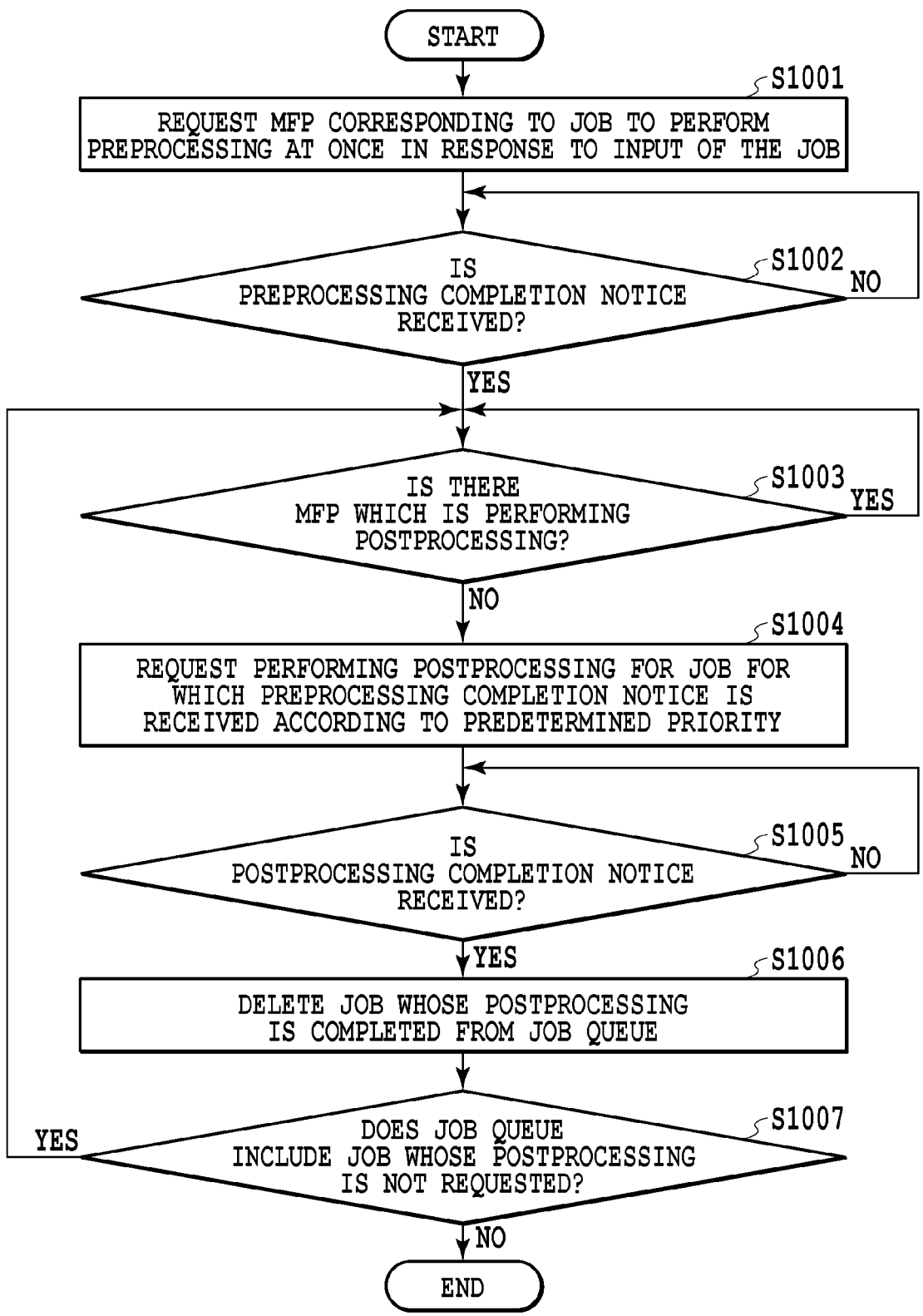
FIG. 10 is a flowchart showing processing for controlling jobs including processing for causing a predetermined high-priority job to interrupt a plurality of jobs according to Embodiment 2 of the present invention.

FIG. 10 is a flowchart showing job control processing for causing postprocessing for a specific job to interrupt other postprocessing based on predetermined priority according to the present embodiment.

Firstly, the job division unit 602 of the server 420 divides, into preprocessing and postprocessing, each of print jobs received from the PCs 411 to 413 and copy jobs and FAX reception jobs received from the MFPs 401 to 403 (see the flowchart shown in FIG. 7). A copy job, for example, is divided into:

Preprocessing which is processing for scanning a manuscript set on a platen to perform image processing, and generating and storing image data; and Postprocessing which is processing for decompressing the image data stored in an HDD or the like as necessary and driving the print engine by the printer unit 520 to print on a print medium such as paper Further, a FAX reception job is divided into:

Preprocessing which is processing for generating and storing bitmap data based on FAX data received from a communication line (PSTN) via the FAX I/F 506; and Postprocessing which is processing for decompressing the image data stored in an HDD or the like as necessary and driving the print engine by the printer unit 520 to print on a print medium such as paper.

In a case where the communication unit 601 of the server 420 receives a SEND job from the MFPs 401 to 403, an MFP corresponding to the SEND job is requested to perform the SEND job at once in response to input of the SEND job. In the present embodiment, processing for the SEND job includes scanning a manuscript set on a platen and transmitting image data to a transfer destination PC or the like via the network 430. The SEND job does not require driving of the print engine and can be performed with extremely low power consumption as compared with a copy job and the like. Accordingly, the SEND job can be performed in the same manner as the above-described preprocessing. In other words, in a case where a plurality of SEND jobs are input substantially at the same time, the server 420 can perform the SEND jobs at appropriate timings in the order that the SEND jobs are received. Incidentally, in the present embodiment, in a case where a plurality of FAX SEND jobs are input substantially at the same time, the server 420 can also perform the FAX SEND jobs at appropriate timings in the order that the FAX SEND jobs are input for a reason which is substantially the same as the one for the SEND jobs. Detailed explanation will be made below with reference to the flowchart of FIG. 10.

In step 1001, the job management unit 604 requests an MFP specified by each job stored in the job queue 603 to perform preprocessing for the job at once in response to input of the job. Further, in a case where a job stored in the job queue 603 is a SEND job, an MFP specified by the SEND job is also requested to perform SEND processing at once in response to input of the SEND job.

In step 1002, the job management unit 604 determines whether or not a preprocessing completion notice (in the case of the SEND job, a SEND processing completion notice) is received from the MFP which is requested to perform preprocessing. Preprocessing completion notices for a copy job and a FAX reception job are issued at a stage where a manuscript set on a platen is scanned and image data is generated. Further, a request to perform preprocessing or SEND processing is made at appropriate timing at a stage where a job is received and divided. Accordingly, there may be a case where the preprocessing completion notice and the SEND processing completion notice are received substantially at the same time from the plurality of MFPs. In a case where the preprocessing completion notice or the SEND processing completion notice is received, the process proceeds to step 1003. In the case of the SEND job, the process ends in step 1002.

In step 1003, the job management unit 604 determines whether an MFP, which is performing postprocessing, is on the network. In the present embodiment, it is determined whether or not any of the MFPs 401 to 403 is performing print processing as postprocessing. If determined that there is no MFP which is performing postprocessing, the process proceeds to step 1004. On the other hand, if determined there is an MFP which is performing print processing as postprocessing, the job management unit 604 is in a standby state until the postprocessing is completed.

In step 1004, the job management unit 604 requests, according to predetermined priority, performing postprocessing for the job for which the preprocessing completion notice is received. More specifically, in a case where the preprocessing completion notices are received from the plurality of MFPs, postprocessing for a job whose predetermined priority is the highest is requested to be performed.

In step 1005, the job management unit 604 determines whether or not a postprocessing completion notice is received from an MFP which is requested to perform the postprocessing. If determined that the postprocessing completion notice is received, the process proceeds to step 1006. On the other hand, if determined that the postprocessing completion notice is not received, the job management unit 604 waits to receive the postprocessing completion notice.

In step 1006, the job management unit 604 deletes, from the job queue 603, a job relating to the received postprocessing completion notice.

In step 1007, the job management unit 604 determines whether or not the job queue 603 includes a job whose postprocessing is not requested. More specifically, by referring to the job queue 603, the job management unit 604 determines whether or not the job queue 603 includes a job for which the preprocessing completion notice is received but whose postprocessing is not requested to be performed. If determined that the job queue 603 includes a job whose postprocessing is not requested, the process returns to step 1003, and in a case where there is no other MFP which is performing postprocessing, a request to perform postprocessing is made according to the predetermined priority. In the present embodiment, the process returns to step 1003, but the process may return to step 1004. This is because requests to perform postprocessing are not simultaneously issued to the plurality of MFPs and a determination result in step 1003 to which the process returns is always "No," which in the end, allows the process to proceed to step 1004. On the other hand, if determined that the job queue 603 does not include a job whose postprocessing is not requested, the process ends. Incidentally, each MFP may appropriately shift to the sleep state after the MFP completes preprocessing or postprocessing.

This is the details of the job control processing of the present embodiment.

<Case where all Jobs have the Same Priority>

Figure 11:
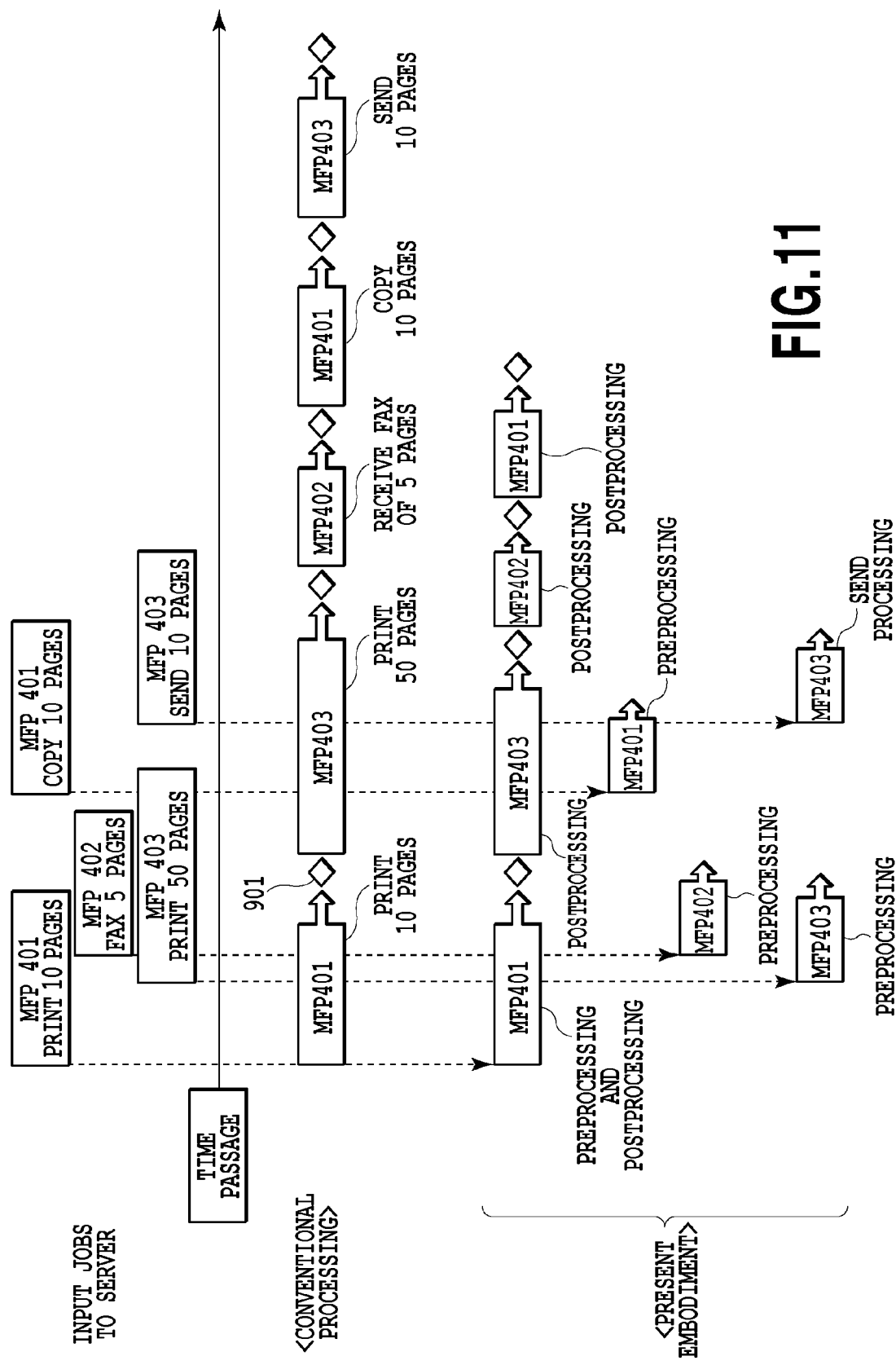
FIG. 11 is a diagram for explaining how to perform print jobs, a copy job, a FAX reception job, and a SEND job by a plurality of MFPs on a network according to Embodiment 2 of the present invention as compared with a conventional technique.

In the present embodiment, explanation will be made on control of jobs in a case where a plurality of types of jobs all have the same priority. FIG. 11 is a diagram showing, in time series, how to perform each job in a case where a plurality of types of jobs sequentially input to the MFPs 401 to 403 have the same priority as compared with a conventional technique. This example assumes sequential input of a print job to the MFP 401 for printing 10 pages, a print job to the MFP 403 for printing 50 pages, a FAX reception job to the MFP 402 for receiving five pages, a copy job to the MFP 401 for copying 10 pages, and a SEND job to the MFP 403 for sending 10 pages.

In conventional processing, jobs specified by the MFPs are sequentially performed in the order that the jobs are registered in the server (in the order that the jobs are input). More specifically, the MFP 401 is firstly instructed to print 10 pages, and thereafter the MFP 403 is instructed to print 50 pages, and so on. In this manner, the jobs are performed in a nonoverlapping manner in the order that the jobs are input.

On the other hand, in the present embodiment, postprocessing that involves driving of the print engine is controlled to be performed in the order that jobs for the postprocessing are registered in the server so as to prevent the postprocessing from being performed simultaneously by the plurality of MFPs, while preprocessing or SEND processing is controlled to be performed at appropriate timing at a stage where each job for the preprocessing or the SEND processing is input. More specifically, a target MFP is requested to perform preprocessing or SEND processing at a stage where the job for the preprocessing or the SEND processing is input even in a case where another MFP performs the postprocessing. In the example shown in FIG. 11, while postprocessing for a print job firstly input to the MFP 401 is performed, preprocessing for a print job subsequently input to the MFP 403 and preprocessing for a FAX reception job further subsequently input to the MFP 402 are performed. In the present embodiment, among processing necessary to perform each job, preprocessing is controlled to be performed at the same time as the job is input. Accordingly, total time required for performing processing becomes shorter than the time required for performing conventional processing. Further, the postprocessing whose power consumption is high is controlled to be performed in a nonoverlapping manner, and accordingly, an increase in power consumption can be minimized.

Regarding the order that postprocessing is performed, the job management unit 604 requests the MFPs to perform postprocessing for jobs stored in a job queue according to predetermined priority. In the example shown in FIG. 11, all the jobs have the same predetermined priority, and postprocessing is requested sequentially from the first input job.

<Case where Some of Jobs have High Priority>

Figure 12:
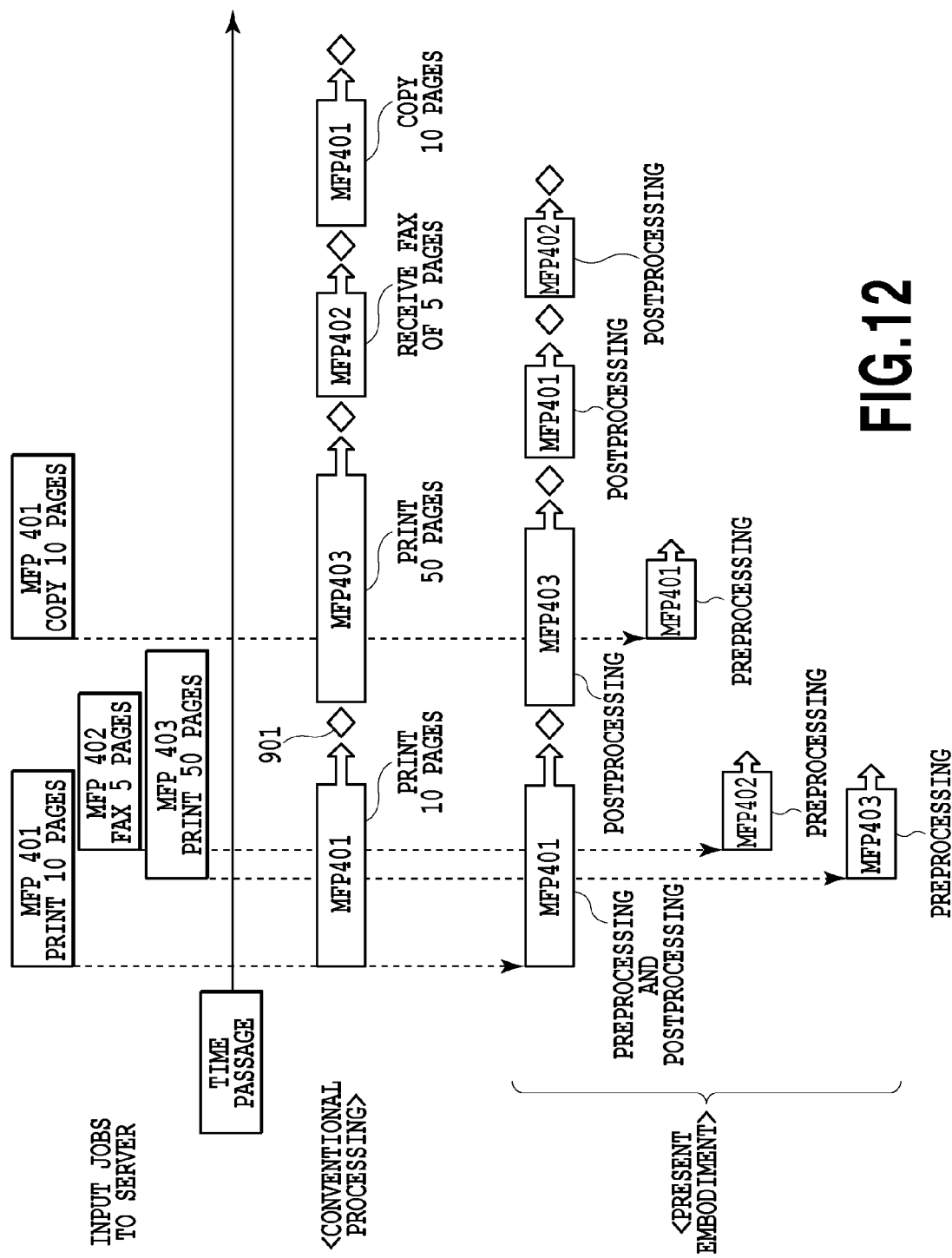
FIG. 12 is a diagram for explaining how to perform print jobs, a copy job, and a FAX reception job by a plurality of MFPs on a network according to Embodiment 2 of the present invention as compared with a conventional technique.

Then explanation will be made on job control in a case where in the present embodiment, some of a plurality of types of jobs have high priority. FIG. 12 is a diagram showing, in time series, how to perform each of a plurality of types of jobs sequentially input to the MFPs 401 to 403 in a case where some of the jobs have different priority levels as compared with a conventional technique. The priority of a copy job is set to be higher than that of the other jobs, and print jobs and a FAX reception job having relatively low priority are set to have the same priority. This example assumes sequential input of a print job to the MFP 401 for printing 10 pages at the beginning, next a print job to the MFP 403 for printing 50 pages, next a FAX reception job to the MFP 402 for faxing five pages, and lastly a copy job to the MFP 401 for copying 10 pages.

In conventional processing, jobs specified by the MFPs are sequentially performed in the order that the jobs are registered in the server (in the order that the jobs are input). More specifically, the MFP 401 is firstly instructed to print 10 pages, and thereafter the MFP 403 is instructed to print 50 pages, and so on. In this manner, the jobs are performed in a nonoverlapping manner in the order that the jobs are input.

On the other hand, in the present embodiment, once the print job is input to the MFP 403 in the course of postprocessing for the print job input to the MFP 401, the MFP 403 performs preprocessing for the print job. Next, once the FAX reception job is input to the MFP 402 in the course of postprocessing for the print job input to the MFP 401, preprocessing for the FAX reception job is performed. At a stage where the postprocessing for the print job input to the MFP 401 is completed, the job queue includes a print job input to the MFP 403 whose postprocessing is not requested and the FAX reception job input to the MFP 402 whose postprocessing is not requested. The job management unit 604 requests the MFPs to perform postprocessing for the jobs stored in the job queue according to set priority. Since the print jobs and the FAX reception job have the same priority as stated above, the job management unit 604 requests the MFP 403 to perform postprocessing for the first input job, that is, the print job input to the MFP 403.

Next, once the copy job is input to the MFP 401 in the course of postprocessing for the print job input to the MFP 403, the MFP 401 performs preprocessing for the copy job. At a stage where the MFP 403 completes postprocessing for the print job, the job queue includes the FAX reception job input to the MFP 402 whose postprocessing is not requested and the copy job which is input to the MFP 401 whose postprocessing is not requested. The copy job has higher priority than the FAX reception job, and accordingly, the job management unit 604 requests the MFP 401 to perform postprocessing for the copy job. In a case where the MFP 401 completes the postprocessing for the copy job, the job management unit 604 requests the MFP 402 to perform postprocessing for the FAX reception job. In this manner, the postprocessing for the copy job input to the MFP 401 can be performed after the postprocessing for the print job input to the MFP 403 and before the postprocessing for the FAX reception job input to the MFP 402.

<Case where a Plurality of Types of Jobs all have Different Priority Levels>

Figure 13:
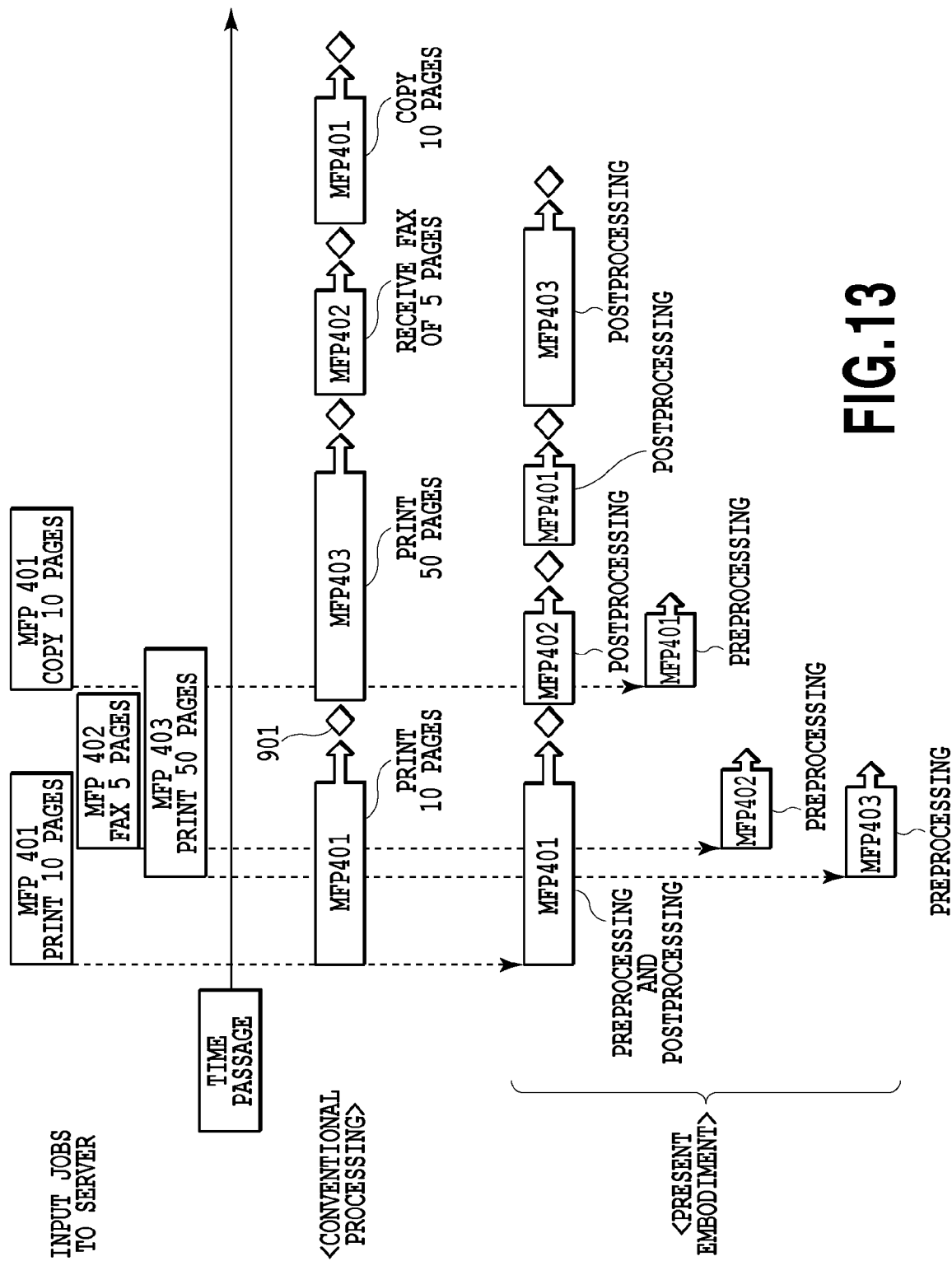
FIG. 13 is a diagram for explaining how to perform print jobs, a copy job, and a FAX reception job by a plurality of MFPs on a network according to Embodiment 2 of the present invention as compared with a conventional technique.

Next, explanation will be made on job control in a case where in the present embodiment, a plurality of types of jobs all have different priority levels. FIG. 13 is a diagram showing, in time series, the process of performing each of a plurality of types of jobs sequentially input to the MFPs 401 to 403 in a case where the jobs all have different priority levels as compared with a conventional technique. In this example, the priority of a copy job is the highest, the priority of a FAX reception job is the second highest, and the priority of print jobs is the lowest. The example assumes sequential input of a print job to the MFP 401 for printing 10 pages at the beginning, next a print job to the MFP 403 for printing 50 pages, next a FAX reception job to the MFP 402 for faxing five pages, and lastly a copy job to the MFP 401 for copying 10 pages.

In conventional processing, jobs specified by the MFPs are sequentially performed in the order that the jobs are registered in the server (in the order that the jobs are input). More specifically, the MFP 401 is firstly instructed to print 10 pages, and thereafter the MFP 403 is instructed to print 50 pages, and so on. In this manner, the jobs are performed in a nonoverlapping manner in the order that the jobs are input.

On the other hand, in the present embodiment, once the print job is input to the MFP 403 in the course of postprocessing for the print job input to the MFP 401, the MFP 403 performs preprocessing for the print job. Next, once the FAX reception job is input to the MFP 402 in the course of postprocessing for the print job input to the MFP 401, preprocessing for the FAX reception job is performed. At a stage where the MFP 401 completes the postprocessing for the print job, the job queue includes the print job input to the MFP 403 whose postprocessing is not requested and the FAX reception job input to the MFP 402 whose postprocessing is not requested. In this case, since the FAX reception job has higher priority than the print job, the job management unit 604 requests the MFP 402 to perform postprocessing for the FAX reception job according to the priority.

Next, once the copy job is input to the MFP 401 in the course of postprocessing for the FAX reception job input to the MFP 402, the MFP 401 performs preprocessing for the copy job. At a stage where the MFP 402 completes postprocessing for the FAX reception job, the job queue includes the print job input to the MFP 403 whose postprocessing is not requested and the copy job input to the MFP 401 whose postprocessing is not requested. In this case, since the copy job has higher priority than the print job, the job management unit 604 requests the MFP 401 to perform postprocessing for the copy job according to the priority. In a case where the MFP 401 completes the postprocessing for the copy job, the job management unit 604 requests the MFP 403 to perform the postprocessing for the print job. In this manner, the postprocessing for the FAX reception job input to the MFP 402 and the postprocessing for the copy job input to the MFP 401 can be performed after the postprocessing for the print job input to the MFP 401 and before the postprocessing for the print input to the MFP 403.

As described above, according to the present embodiment, it becomes possible to preferentially perform a high priority job in addition to achieving the advantageous results of Embodiment 1, and accordingly, it becomes possible to further reduce a user's waiting time.

<Variation>

Next, consideration will be given to the use of a certain MFP by a user for performing a copy job in the course of postprocessing for a print job by the MFP for printing a plurality of sets of sheets. If it is impossible to make a copy until the MFP completes all processing for the print job for printing the plurality of sets of sheets, the user has to keep waiting at the MFP until the plurality of sets of sheets are all printed, and may result in significant reduction in work efficiency. In the present embodiment, control is performed so that postprocessing for a job having priority higher than the print job interrupts the postprocessing for the print job for printing the plurality of sets of sheets. More specifically, in a case where the print job is a print job for printing N sets (N is an integer of 2 or more) such as a total of 10 sets, control is performed so that the postprocessing for the copy job interrupts the postprocessing for the print job after the postprocessing for the print job for printing four sets is completed, and after the postprocessing for the copy job is completed, postprocessing for the print job for printing the remaining six sets is performed. In this manner, control is performed so that the copy job is preferentially performed, whereby the user does not have to wait at the MFP until all the sets are printed.

Job control processing for the present variation will be described below.

Figure 14:
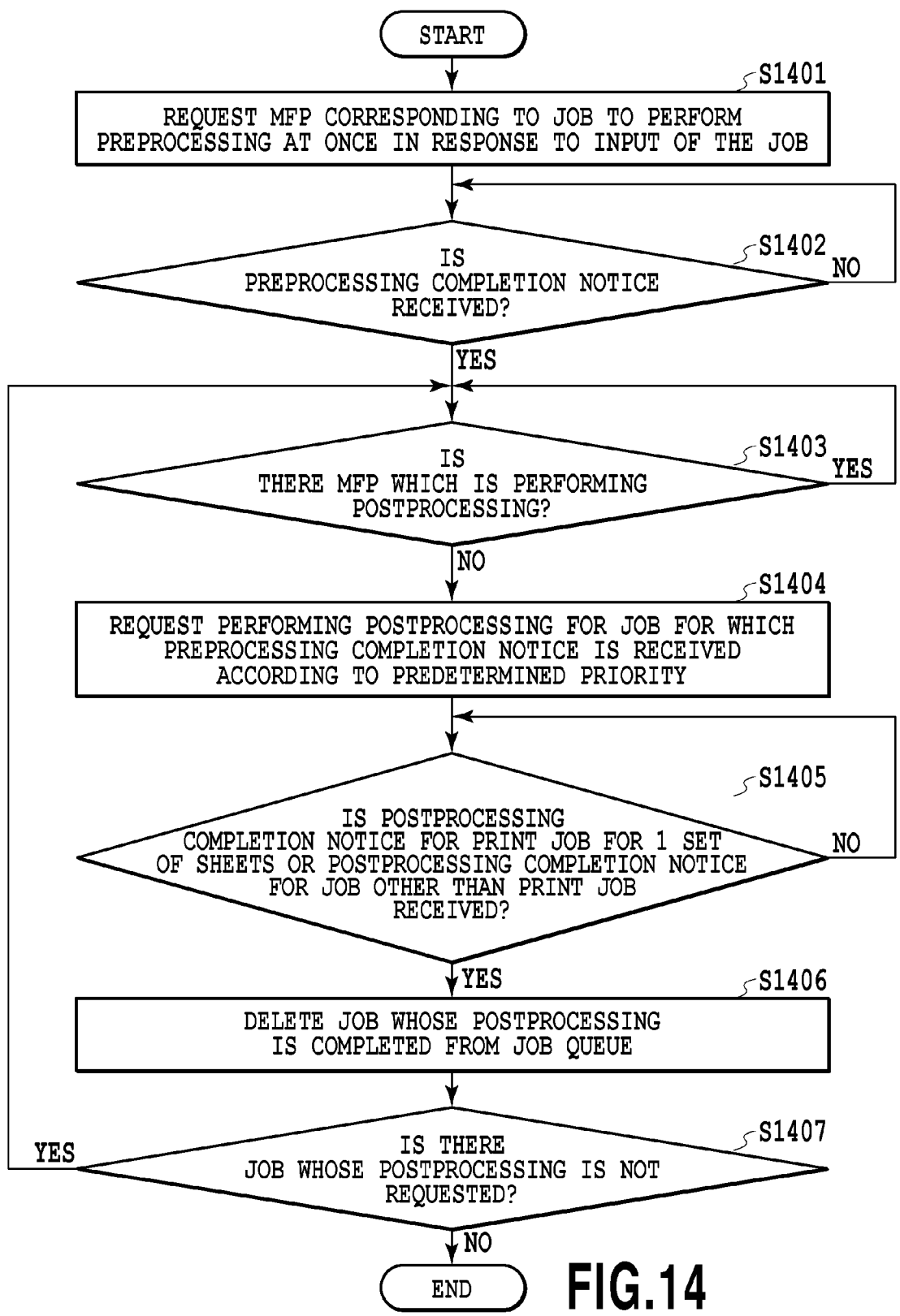
FIG. 14 is a flowchart showing processing for controlling jobs including processing for causing a predetermined high-priority job to interrupt print jobs for a plurality of sets of sheets according to Embodiment 2 of the present invention.

FIG. 14 is a flowchart showing job control processing including processing for interrupting postprocessing for a print job for printing a plurality of sets of sheets to perform postprocessing for another job according to the present variation.

Firstly, the job division unit 602 of the server 420 divides each of print jobs received from the PCs 411 to 413 and jobs received from the MFPs 401 to 403 into preprocessing and postprocessing (see the flowchart of FIG. 7). Assume that jobs handled here are two types of jobs, that is, print jobs and copy jobs, and that a print job is a print job for giving an instruction to print and output a plurality of sets (N sets).

In step 1401, the job management unit 604 of the server 420 requests an MFP specified by each job stored in the job queue 603 to perform preprocessing for the job at once in response to input of the job.

In step 1402, the job management unit 604 determines whether or not a preprocessing completion notice is received from the MFP which is requested to perform the preprocessing. The request to perform the preprocessing is made at appropriate timing at a stage where a job is received and divided. Accordingly, there may be a case where preprocessing completion notices are received substantially at the same time from the plurality of MFPs. In a case where the preprocessing completion notice for the job is received, the process proceeds to step 1403.

In step 1403, the job management unit 604 determines whether on the network there is an MFP which is performing print processing as postprocessing. In the present variation, it is determined whether or not any of the MFPs 401 to 403 is performing print processing as postprocessing. If determined that there is no MFP which is performing print processing as postprocessing, the process proceeds to step 1404. On the other hand, if determined that there is an MFP which is performing print processing as postprocessing, the job management unit 604 is in a standby state by until the postprocessing is completed.

In step 1404, the job management unit 604 requests, according to predetermined priority, performing postprocessing for the job for which the preprocessing completion notice is received. More specifically, in a case where the preprocessing completion notices are received from the plurality of MFPs, postprocessing for a job whose predetermined priority is high is requested to be performed.

In step 1405, the job management unit 604 determines whether or not a postprocessing completion notice is received from an MFP which is requested to perform the postprocessing. More specifically, it is determined whether a postprocessing completion notice for a print job for printing one set or a postprocessing completion notice for a job other than the print job is received. If determined that the postprocessing completion notice is received, the process proceeds to step 1406. On the other hand, if determined that the postprocessing completion notice is not received, the job management unit 604 waits to receive the postprocessing completion notice.

In step 1406, the job management unit 604 deletes, from the job queue 603, a job relating to the received postprocessing completion notice. More specifically, the job management unit 604 deletes, from the job queue 603, a job for one set whose postprocessing is completed out of a print job for N sets or a job which is other than the print job and whose postprocessing is completed.

In step 1407, the job management unit 604 determines whether or not the job queue 603 includes a job whose postprocessing is not requested. More specifically, the job management unit 604 determines whether or not the job queue 603 includes a print job having unrequested postprocessing corresponding to sets which are not yet printed out of N sets or a job other than the print job whose postprocessing is not requested. If determined that the job queue 603 includes a job whose postprocessing is not requested, the process returns to step 1403, and in a case where there is no other MFP which is performing postprocessing, a request to perform the postprocessing for the job is made according to the predetermined priority. In the present embodiment, the process returns to step 1403, but the process may return to step 1404. This is because requests to perform postprocessing are not simultaneously issued to the plurality of MFPs and a determination result in step 1403 to which the process returns is always "No," which in the end, allows the process to proceed to step 1404. On the other hand, if determined that the job queue 603 does not include a job whose postprocessing is not requested, that is, if postprocessing for the print job for printing N sets and postprocessing for the jobs other than the print job are all completed, the process ends. Incidentally, in the present embodiment, each MFP may appropriately shift to the sleep state after the MFP completes preprocessing or postprocessing.

Figure 15:
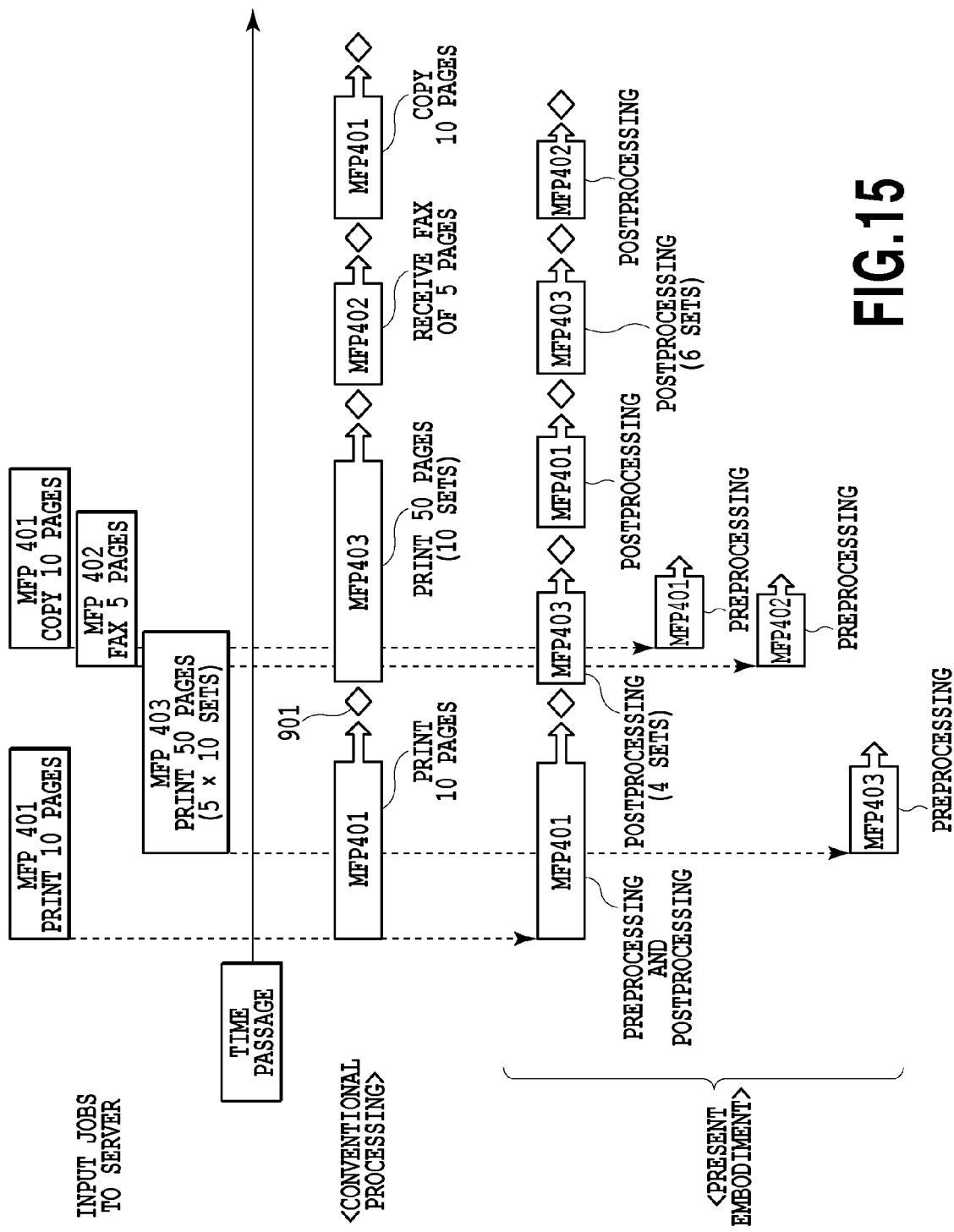
FIG. 15 is a diagram for explaining how to perform print jobs, a copy job, and a FAX reception job by a plurality of MFPs on a network according to Embodiment 2 of the present invention as compared with a conventional technique.
Figure 16:
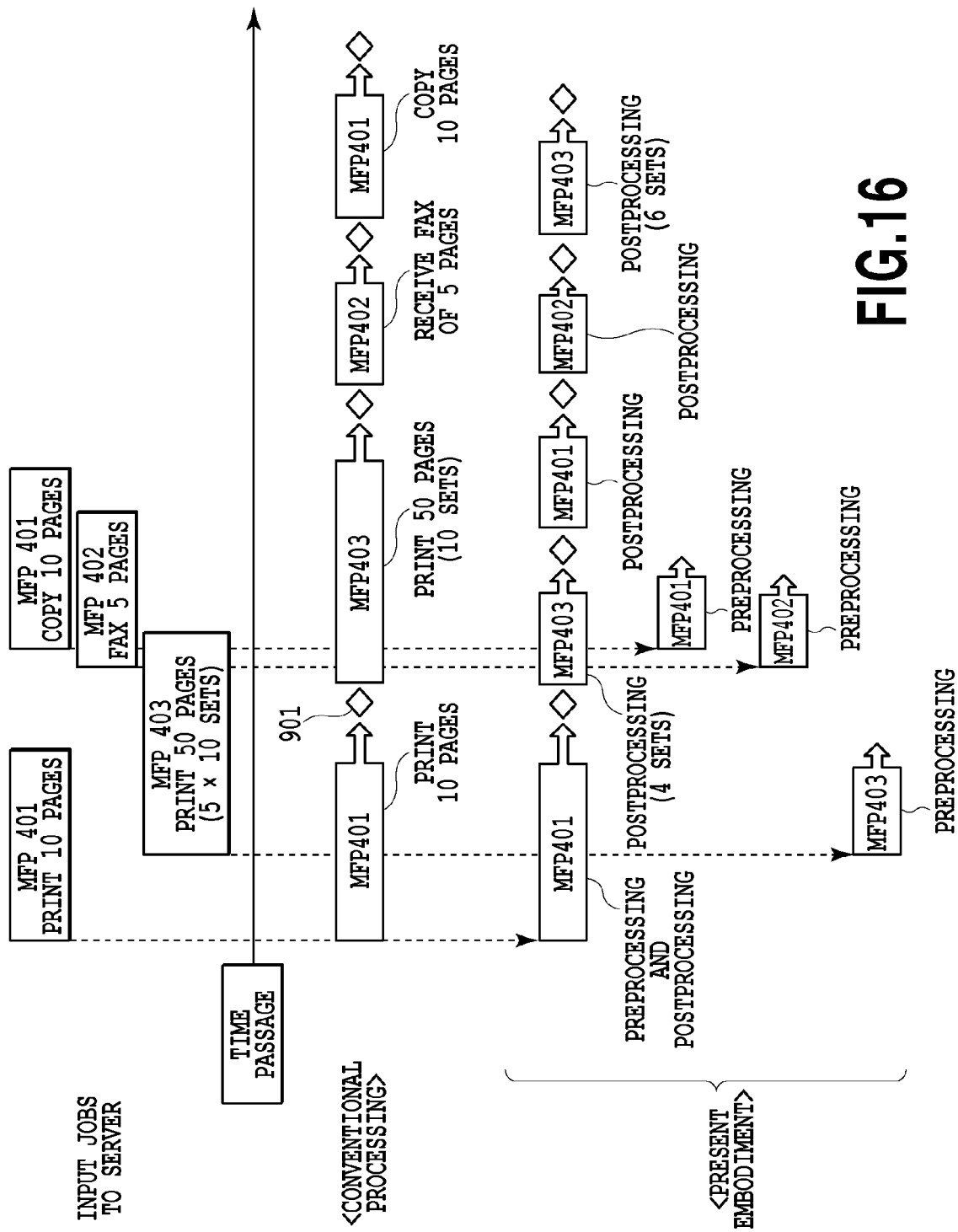
FIG. 16 is a diagram for explaining how to perform print jobs, a copy job, and a FAX reception job by a plurality of MFPs on a network according to Embodiment 2 of the present invention as compared with a conventional technique.

FIGS. 15 and 16 are diagrams showing, in time series, how to process each of a plurality of types of jobs sequentially input to the MFPs 401 to 403 in the present variation as compared with a conventional technique. In an example shown in FIG. 15, the priority of a copy job is set to be higher than that of the other jobs, and print jobs and a FAX reception job having relatively low priority are set to have the same priority as in the case of FIG. 12. In an example shown in FIG. 16, the priority of a copy job is the highest, the priority of a FAX reception job is the second highest, and the priority of print jobs is the lowest as in the case of FIG. 13. Both examples assume sequential input of a print job to the MFP 401 for printing 10 pages at the beginning, next a print job to the MFP 403 for printing 50 pages is input, next a FAX reception job to the MFP 402 for faxing five pages, and lastly a copy job to the MFP 401 for copying 10 pages. Further, the print job for printing 50 pages which is input to the MFP 403 is a job for printing N sets in which one set includes five pages, and N represents 10 (sets).

Firstly, the case shown in FIG. 15 will be described.

In conventional processing, jobs specified by the MFPs are sequentially performed in the order that the jobs are registered in the server (in the order that the jobs are input). More specifically, the MFP 401 is firstly instructed to print 10 pages, and thereafter the MFP 403 is instructed to print 50 pages (5×10 sets), and so on. In this manner, the jobs are performed in a nonoverlapping manner in the order that the jobs are input.

On the other hand, in the present variation, once the FAX reception job is input to the MFP 402 in the course of postprocessing for the print job input to the MFP 403, the MFP 402 performs preprocessing for the FAX reception job. Further, once the copy job is further input to the MFP 401 in the course of postprocessing for the print job input to the MFP 403, the MFP 401 performs preprocessing for the copy job. At a stage where the MFP 403 completes the postprocessing for the print job for printing four sets, the job queue includes the three jobs whose postprocessing is not requested, that is, the FAX reception job input to the MFP 402, the copy job input to the MFP 401, and the print job for printing six sets which is input to the MFP 403. In this case, the job management unit 604 requests the MFP to perform postprocessing for the jobs stored in the job queue according to the set priority. In the example shown in FIG. 15, since the copy job has higher priority than the other jobs, the job management unit 604 requests the MFP 401 to perform postprocessing for the copy job.

In a case where the MFP 401 completes the postprocessing for the copy job, the job management unit 604 requests the MFP 403 to perform postprocessing for the first input job, that is, the print job for printing the remaining six sets since the print job and the FAX reception job have the same priority. In a case where the MFP 403 completes the postprocessing for the print job for printing the remaining six sets, the job management unit 604 requests the MFP 402 to perform postprocessing for the FAX reception job. In this manner, it becomes possible to perform the postprocessing for the copy job input to the MFP 401 after the MFP 403 performs postprocessing for the print job of printing four sets out of 10 sets and before the MFP 403 performs postprocessing for the print job of printing the remaining six sets.

Next, the case shown in FIG. 16 will be described. Conventional processing in the example shown in FIG. 16 is the same as that in the example shown in FIG. 15, and thus omitted.

Firstly, once a FAX reception job is input to the MFP 402 in the course of postprocessing for a print job input to the MFP 403, the MFP 402 performs preprocessing for the FAX reception job. Further, once the copy job is further input to the MFP 401 in the course of postprocessing for the print job input to the MFP 403, the MFP 401 performs preprocessing for the copy job. At a stage where the MFP 403 completes the postprocessing for the print job of printing four sets, the job queue includes the three jobs whose postprocessing is not requested, that is, the FAX reception job input to the MFP 402, the copy job input to the MFP 401, and the print job for printing six sets which is input to the MFP 403. In the example shown in FIG. 16, since the priority of the copy job is higher than that of the other jobs, the job management unit 604 requests the MFP 401 to perform postprocessing for the copy job. The above description of FIG. 16 corresponds to that of FIG. 15.

In the case shown in FIG. 16, once the MFP 401 completes the postprocessing for the copy job, the job management unit 604 requests the MFP 402 to perform postprocessing for the FAX reception job having higher priority than the print job. At a stage where the MFP 402 completes the postprocessing for the FAX reception job, the MFP 403 is requested to perform postprocessing for the print job for printing the remaining six sets. In this manner, the MFP 401 can perform the postprocessing for the copy job and the MFP 402 can perform the postprocessing for the FAX reception job after the MFP 403 performs the postprocessing for the print job of printing four sets out of 10 sets and before the MFP 403 performs the postprocessing for the print job of printing the remaining six sets.

[Embodiment 3]

Next, explanation will be made on a case where a job itself such as a print job (image data, a control command for controlling printing using the image data, and the like) to be input from a PC is transmitted to the server, and a job itself such as a copy job to be directly input to an MFP is not transmitted to the server but the fact that the job is input is notified. The configuration of a job management system of the present embodiment is the same as those of Embodiments 1 and 2 except for the server 420 which is replaced by a server 1701, and thus omitted.

Figure 17:
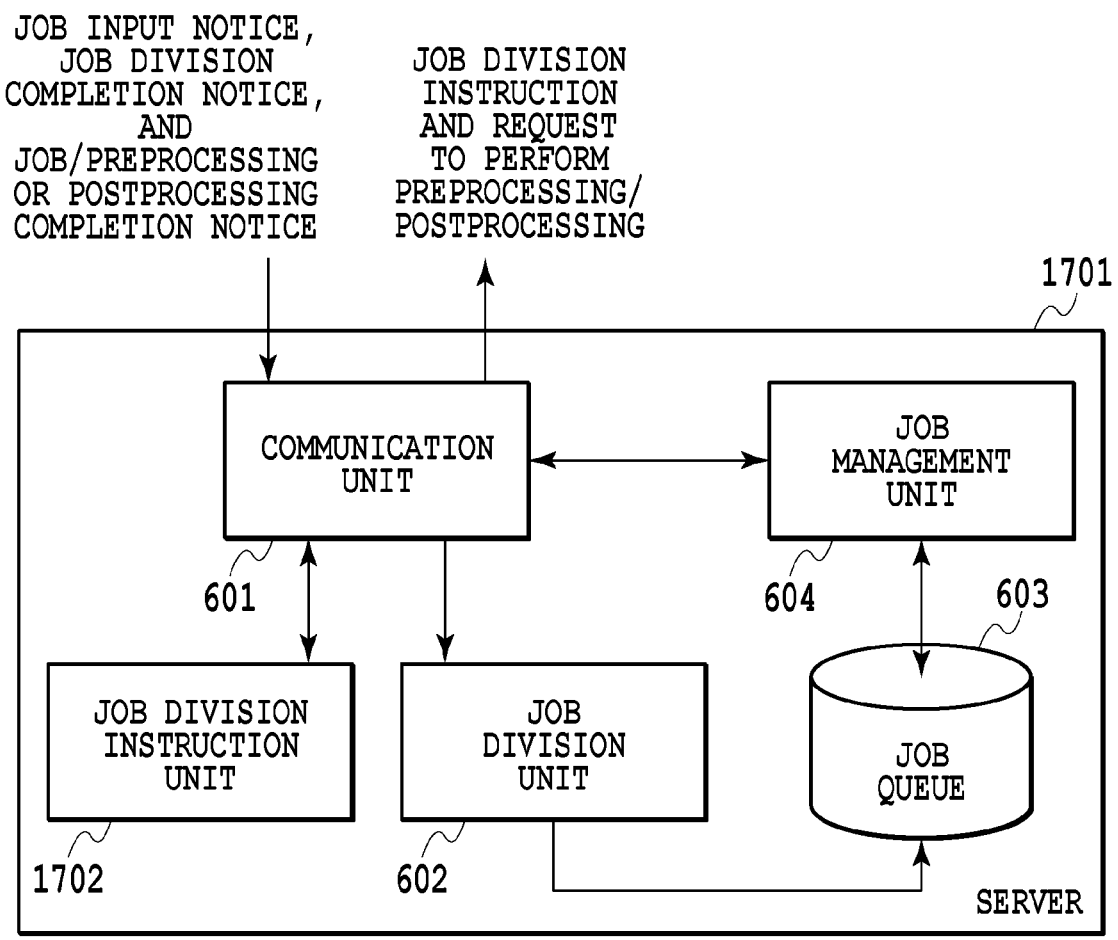
FIG. 17 is a functional block diagram showing the software configuration of a server.

FIG. 17 is a functional block diagram showing the software configuration of the server 1701. The server 1701 includes the communication unit 601, the job division unit 602, the job queue (storage unit) 603, the job management unit 604, and a job division instruction unit 1702.

The communication unit 601 communicates with the PCs 411 to 413 and the MFPs 401 to 403. More specifically, the communication unit 601 receives, from any of the MFPs 401 to 403, the notice that a job (a first job) such as a copy job, a FAX job, or a SEND job is directly input to the MFP. Further, the communication unit 601 receives, from any of the PCs 411 to 413, a job (a second job) input from the PC such as a print job. The notice that the first job is input (the job-input notice) is transmitted from the MFP to the server 1701 in a case where the job such as the copy job is input to the MFP, and includes information for specifying the MFP to which the job is input and metadata for the job. The metadata for the job is information for identifying the job, and includes a file name, an extension, and a date when the data was created. Further, the communication unit 601 transmits an instruction to divide the job (a job division instruction) to the MFP which transmits the job-input notice, and requests performing preprocessing and postprocessing after the job is divided. Further, the communication unit 601 also transmits and receives data such as image data relating to the second job and various notices which will be described later (such as a preprocessing completion notice, a postprocessing completion notice, and the notice that the division of the job is completed) to and from the PC.

The job queue 603 of the present embodiment stores not only jobs which are divided into preprocessing and postprocessing, but also metadata for the divided jobs.

In response to reception of the job-input notice, the job division instruction unit 1702 instructs the MFP which transmits the job-input notice to divide the job into the preprocessing and the postprocessing via the communication unit 601.

Other software configurations of the server 1701 are not different from those of Embodiments 1 and 2, and thus omitted.

Figure 18:
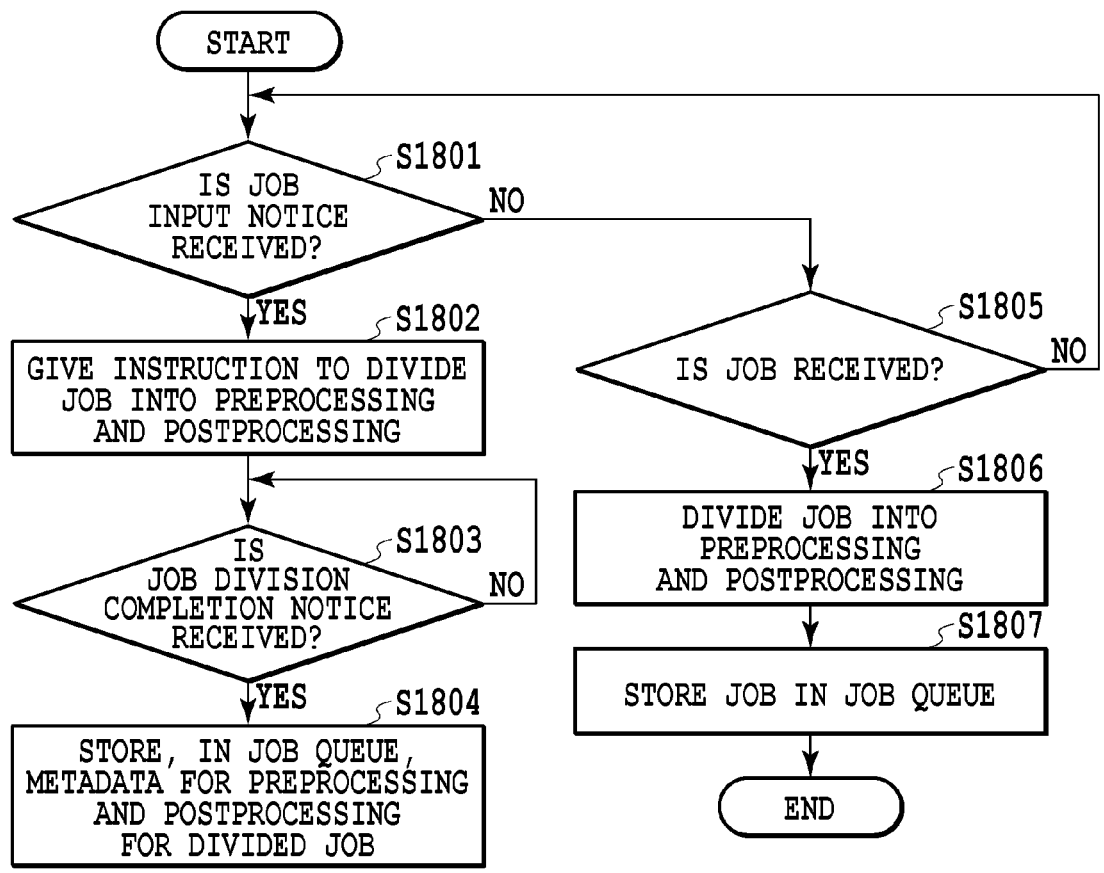
FIG. 18 is a flowchart showing processing for controlling jobs according to Embodiment 3 of the present invention.
Figure 19:
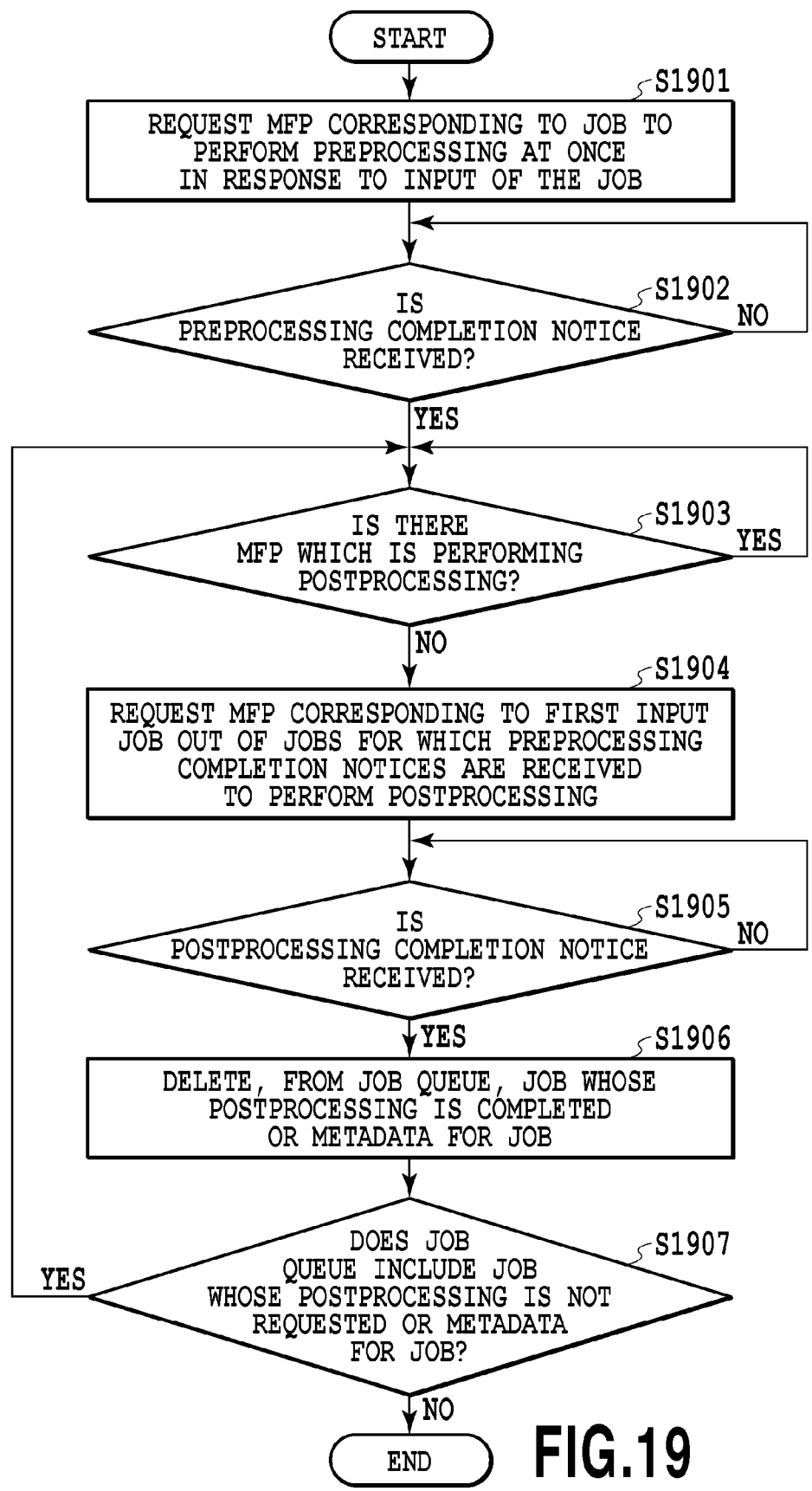
FIG. 19 is a flowchart showing processing for controlling jobs according to Embodiment 3 of the present invention.

Next, explanation will be made on job control processing performed by the server 1701 of the present embodiment. FIGS. 18 and 19 are flowcharts showing the job control processing of the present embodiment. The flowchart of FIG. 18 shows control for transmitting a job division instruction to an MFP and storing metadata for a divided job in a job queue and control for dividing a received job itself and storing the divided job in the job queue. Further, the flowchart of FIG. 19 shows control of timings for performing preprocessing and postprocessing of the job stored in the job queue or the job corresponding to the metadata according to the operation states of the MFPs.

Firstly, the flowchart of FIG. 18 will be described.

In step 1801, the communication unit 601 of the server 1701 determines whether or not a job-input notice for a first job is received from any of the MFPs 401 to 403. If determined that the job-input notice is received, the process proceeds to step 1802. On the other hand, if determined that the job-input notice is not received, the process proceeds to step 1805.

In step 1802, the job division instruction unit 1702 instructs the MFP which transmits the job-input notice to divide the job corresponding to the received job-input notice into preprocessing and postprocessing (transmission of a job division instruction). The MFP which receives the job division instruction divides the input job into the preprocessing and the postprocessing, and stores the divided job in a RAM or the like of the memory unit 502. Then the MFP which has completed the job division processing transmits, to the server 1701, the notice that division of the job is completed (the job division completion notice). The job division completion notice includes information for specifying to which MFP the job is input and metadata for the job.

In step 1803, the communication unit 601 of the server 1701 determines whether or not the job division completion notice is received from the MFP. If determined that the job division completion notice is received, the process proceeds to step 1804. On the other hand, if determined that the job division completion notice is not received, the communication unit 601 of the server 1701 waits to receive the job division completion notice.

In step 1804, the job management unit 604 generates metadata for the preprocessing for the divided job and metadata for the postprocessing for the divided job, and stores the metadata in the job queue 603. The metadata for the preprocessing for the job and the metadata for the postprocessing for the job are generated based on metadata included in the job division completion notice.

In step 1805, the communication unit 601 determines whether or not a second job is received from any of the PCs 411 to 413. If determined that the second job is received, the process proceeds to step 1806. On the other hand, if determined that the second job is not received, the process returns to step 1801.

In step 1806, the job division unit 602 divides the received second job into preprocessing and postprocessing as in the case of Embodiment 1.

In step 1807, the job division unit 602 stores the job divided into the preprocessing and the postprocessing in a RAM or the like as the job queue 603.

Next, the flowchart of FIG. 19 will be described.

In step 1901, the job management unit 604 requests an MFP specified by each job to perform preprocessing at once in response to input of the job based on metadata for a first job or a second job stored in the job queue 603.

In step 1902, the job management unit 604 determines whether or not a preprocessing completion notice is received from the MFP which is requested to perform the preprocessing.

In step 1903, the job management unit 604 determines whether an MFP, which is performing print processing as postprocessing, is on the network. If determined that there is no MFP which is performing the postprocessing, the process proceeds to step 1904. On the other hand, if determined that there is an MFP which is performing the postprocessing, the job management unit 604 is in a standby state until the postprocessing is completed.

In step 1904, the job management unit 604 requests an MFP specified by the first input job to perform the postprocessing, the first input job being a job among the jobs for which preprocessing completion notices are received.

In step 1905, the job management unit 604 determines whether or not a postprocessing completion notice is received from the MFP which is requested to perform the postprocessing. If determined that the postprocessing completion notice is received, the process proceeds to step 1906.

In step 1906, the job management unit 604 deletes, from the job queue 603, metadata for a first job or a second job which relates to the received postprocessing completion notice.

In step 1907, the job management unit 604 determines whether or not the job queue 603 includes metadata for a first job or a second job whose postprocessing is not requested. More specifically, the job management unit 604 refers to the job queue 603 to determine whether there is metadata for a first job or a second job for which a preprocessing completion notice is received but whose postprocessing is not requested to be performed. If determined that the job queue 603 includes metadata for a first job or a second job whose postprocessing is not requested to be performed, the process returns to step 1903, and if determined that there is no other MFP which is performing postprocessing, postprocessing for the first input job is requested to be performed. In the present embodiment, the process returns to step 1903, but the process may return to step 1904. This is because requests to perform postprocessing are not simultaneously issued to the plurality of MFPs and a determination result in step 1903 to which the process returns is always "No," which in the end, allows the process to proceed to step 1904. On the other hand, in a case where the job queue 603 does not include metadata for a first job or a second job whose postprocessing is not requested, the process ends.

In the present embodiment, steps 1805 to 1807 in the flowchart of FIG. 18 are usually performed for a second job such as a print job which is input from a PC. However, a print job, for example, may be directly transmitted from a PC to an MFP without being transmitted through the server 1701, and in a case where a print job is transmitted to an MFP, the MFP may transmit to the server 1701, the notice that the print job is input. More specifically, like a first job, a second job such as a print job which is input from a PC may be handled in job division processing. In this case, steps 1805 to 1807 in the flowchart of FIG. 18 become unnecessary.

Further, in the present embodiment, in step 1904, a request is made to perform postprocessing in the order from postprocessing for the first input job among jobs for which preprocessing completion notices are received. However, a request to perform postprocessing may be made according to predetermined priority as in Embodiment 2.

Further, processing for causing a job to interrupt a print job for printing a plurality of sets of sheets as explained as the variation of Embodiment 2 may be applied to the present embodiment.

In the present embodiment, jobs input to the plurality of MFPs can be performed on an expedited basis while the total maximum power consumption of the plurality of MFPs is kept at a low level as in the cases of Embodiments 1 and 2.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it becomes possible to maintain power consumption at a low level in consideration of efficient processing for performing various jobs including jobs other than jobs input via a network. Further, since a dedicated measurement device and the like are unnecessary, the cost can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-143217, filed Jul. 11, 2014 which is hereby incorporated by reference herein in its entirety.

What is claimed is:

1. A server for managing a plurality of jobs to be performed by a plurality of image forming devices having a print engine, the server comprising:
   a processor and a memory storing a program to be executed by the processor, wherein the processor executes the program to function as:
   a job division instruction unit configured to instruct the image forming devices to which the jobs are input to divide each of the plurality of jobs into preprocessing that does not involve driving of the print engine and postprocessing that involves driving of the print engine; and
   a job management unit configured to control timing of starting the postprocessing to prevent the postprocessing from being performed simultaneously by the plurality of image forming devices, wherein the preprocessing is a low power consumption mode and the postprocessing is a high power consumption mode.

2. The server according to claim 1, wherein the job management unit controls timing of starting the preprocessing by the plurality of image forming devices to allow the preprocessing to be performed at once in response to input of the jobs while simultaneous performance of the jobs is not prevented.

3. The server according to claim 2, further comprising a communication unit configured to receive information about the jobs, wherein
in a case where the communication unit receives a notice that the image forming devices have completed the preprocessing, the job management unit determines whether there is an image forming device which is performing the postprocessing, and if determined that there is no image forming device which is performing the postprocessing, the job management unit requests an image forming device corresponding to a first input job to perform postprocessing for the first input job, the first input job being a job among the jobs for which the notices that the preprocessing is completed are received.

4. The server according to claim 3, wherein the allowing of the preprocessing to be performed in response to input of the jobs while not preventing simultaneous performance of the jobs represents requesting of the image forming devices to perform the preprocessing in the order that the communication unit receives information about the jobs.

5. The server according to claim 1, wherein
the jobs include different types of jobs,
the job management unit controls the timing of starting the postprocessing for each of the different types of jobs according to predetermined priority, and
the different types of jobs include at least a copy job, and the predetermined priority of the copy job is higher than the predetermined priority of another type of job.

6. The server according to claim 5, wherein in a case where a plurality of jobs have same predetermined priority, a request is made to perform postprocessing for a first input job among the jobs for which notices that the preprocessing is completed are received.

7. The server according to claim 1, further comprising a communication unit configured to receive information about the jobs, wherein
the jobs include a print job of printing a plurality of sets of sheets, and
the job management unit determines whether there is an image forming device which is performing postprocessing in response to receiving a notice that postprocessing for the print job for one set of sheets is completed, and if determined that there is no image forming device which is performing postprocessing, the job management unit requests an image forming device corresponding to a job whose predetermined priority is the highest to perform postprocessing to the job whose predetermined priority is the highest, the job whose predetermined priority is the highest being a job among the jobs for which notices that the preprocessing is completed are received.

8. The server according to claim 1, wherein the plurality of image forming devices include different types of image forming devices.

9. A server for managing a plurality of jobs to be performed by a plurality of image forming devices having a print engine, the server comprising:
a processor and a memory storing a program to be executed by the processor, wherein the processor executes the program to function as:
a communication unit configured to receive the jobs from the plurality of image forming devices;
a job division unit configured to divide each of the plurality of jobs received by the communication unit into preprocessing that does not involve driving of the print engine and postprocessing that involves driving of the print engine; and
a job management unit configured to control timing of starting the postprocessing to prevent the postprocessing from being performed simultaneously by the plurality of image forming devices, wherein the preprocessing is a low power consumption mode and the postprocessing is a high power consumption mode.

10. A server for managing a plurality of jobs to be performed by a plurality of image forming devices having a print engine, the server comprising:
a processor and a memory storing a program to be executed by the processor, wherein the processor executes the program to function as:
a job division instruction unit configured to instruct the image forming devices to divide a first job into preprocessing that does not involve driving of the print engine and postprocessing that involves driving of the print engine, the first job being directly input to the image forming devices;
a job division unit configured to divide a second job into the preprocessing and the postprocessing, the second job not being directly input to the image forming devices; and
a job management unit configured to control timing of starting the postprocessing to prevent the postprocessing from being performed simultaneously by the plurality of image forming devices, wherein the preprocessing is a low power consumption mode and the postprocessing is a high power consumption mode.

11. A job management system in which a server and the plurality of image forming devices having a print engine are connected via a network, the server managing a plurality of jobs to be performed by the plurality of image forming devices, the server comprising:
a processor and a memory storing a program to be executed by the processor, wherein the processor executes the program to function as:
a job division instruction unit configured to instruct the image forming devices to which the jobs are input to divide each of the plurality of jobs into preprocessing that does not involve driving of the print engine and postprocessing that involves driving of the print engine; and
a job management unit configured to control timing of starting the postprocessing to prevent the postprocessing from being performed simultaneously by the plurality of image forming devices, wherein the preprocessing is a low power consumption mode and the postprocessing is a high consumption mode.

12. A job management method executed by a server for managing a plurality of jobs to be performed by a plurality of image forming devices having a print engine, the method comprising the server performing the steps of:
instructing the image forming devices to divide each of the plurality of jobs into preprocessing that does not involve driving of the print engine and postprocessing that involves driving of the print engine, the jobs being directly input to the image forming devices; and
controlling timing of starting the postprocessing to be performed by the plurality of image forming devices to prevent the postprocessing from being performed simultaneously by the plurality of image forming devices, wherein the preprocessing is a low power consumption mode and the postprocessing is a high power consumption mode.

13. A non-transitory computer readable storage medium storing a program for causing a computer to function as a server for managing a plurality of jobs to be performed by a plurality of image forming devices having a print engine, the program comprising code for the server to perform the following steps of:

instructing the image forming devices to divide each of the plurality of jobs into preprocessing that does not involve driving of the print engine and postprocessing that involves driving of the print engine, the jobs being directly input to the image forming devices; and controlling timing of starting the postprocessing to be performed by the plurality of image forming devices to prevent the postprocessing from being performed simultaneously by the plurality of image forming devices, wherein the preprocessing is a low power consumption mode and the postprocessing is a high power consumption mode.

* * * * *